United States Patent [19]
Wakabayashi et al.

[11] Patent Number: 5,748,238
[45] Date of Patent: *May 5, 1998

[54] VIDEO CAMERA

[75] Inventors: Manabu Wakabayashi; Kenji Ogiro, both of Yokohama; Takanori Nishiyama, Mitaka; Hiroto Takita, Higashikurume; Yutaka Takami, Yokohama; Hironobu Satoh, Yokohama; Takesuke Maruyama, Yokohama; Masahiko Yatsu, Chigasaki; Kenji Kobayashi, Yokohama; Shigeyuki Itoh, Kawasaki; Kenji Matsumoto; Iwao Aizawa, both of Yokohama, all of Japan

[73] Assignee: Hitachi, Ltd., Tokyo, Japan

[*] Notice: The term of this patent shall not extend beyond the expiration date of Pat. No. 5,565,919.

[21] Appl. No.: 665,497

[22] Filed: Jun. 18, 1996

Related U.S. Application Data

[62] Division of Ser. No. 27,940, Mar. 8, 1993, Pat. No. 5,565,919.

[30] Foreign Application Priority Data

| Mar. 12, 1992 | [JP] | Japan | 4-053800 |
| Apr. 13, 1992 | [JP] | Japan | 4-092690 |
| Aug. 28, 1992 | [JP] | Japan | 4-229718 |
| Sep. 29, 1992 | [JP] | Japan | 4-259330 |
| Oct. 7, 1992 | [JP] | Japan | 4-268419 |
| Oct. 13, 1992 | [JP] | Japan | 4-274538 |

[51] Int. Cl.[6] .................... H04N 5/225; H04N 5/232
[52] U.S. Cl. .................... 348/373; 348/207; 348/375
[58] Field of Search .................... 348/373, 375, 348/207; 359/145, 146, 163

[56] References Cited

U.S. PATENT DOCUMENTS

| 4,218,871 | 8/1980 | Moritani et al. | 368/109 |
| 4,340,903 | 7/1982 | Tamura | 348/187 |
| 4,478,493 | 10/1984 | Yokota | 350/336 |
| 4,507,683 | 3/1985 | Griesshaber et al. | 348/722 |
| 4,557,574 | 12/1985 | Kohno et al. | 354/288 |
| 4,578,665 | 3/1986 | Yang | 246/166.1 |
| 4,829,383 | 5/1989 | Harase et al. | 348/64 |
| 4,843,475 | 6/1989 | Imai | 348/358 |
| 4,894,731 | 1/1990 | Nakasuna et al. | 360/9.1 |
| 4,951,125 | 8/1990 | Kojima et al. | 358/22 |
| 5,006,881 | 4/1991 | Kodama | 354/484 |
| 5,040,006 | 8/1991 | Matsumura et al. | 354/106 |
| 5,048,939 | 9/1991 | Yatsu et al. | 359/683 |
| 5,099,364 | 3/1992 | Kawabata | 360/33.1 |
| 5,100,223 | 3/1992 | Ono et al. | 359/683 |
| 5,130,804 | 7/1992 | Tamura et al. | 358/209 |
| 5,146,353 | 9/1992 | Isoguchi et al. | 348/232 |
| 5,153,735 | 10/1992 | Shintani et al. | 348/374 |
| 5,159,198 | 10/1992 | Kohsaka et al. | 250/330 |
| 5,161,025 | 11/1992 | Nakao | 348/333 |
| 5,287,223 | 2/1994 | Hirasawa | 359/697 |
| 5,341,171 | 8/1994 | Mori et al. | 348/373 |
| 5,381,179 | 1/1995 | Kashimura | 348/376 |

FOREIGN PATENT DOCUMENTS

| 63-223720 | 9/1988 | Japan | G02B 15/16 |
| 63-224059 | 9/1988 | Japan | G11B 15/10 |
| 132217 | 2/1989 | Japan | G02B 15/16 |
| 198373 | 4/1989 | Japan | H04N 5/225 |
| 1142539 | 6/1989 | Japan | G03B 13/14 |
| 1261086 | 10/1989 | Japan | H04N 5/335 |
| 239011 | 2/1990 | Japan | G02B 15/16 |
| 2210973 | 8/1990 | Japan | H04N 5/225 |
| 333710 | 2/1991 | Japan | G02B 15/16 |
| 3206777 | 9/1991 | Japan | H04N 5/225 |
| 3292067 | 12/1991 | Japan | H04N 5/225 |

*Primary Examiner*—Andrew Faile
*Assistant Examiner*—Andrew B. Christensen

[57] ABSTRACT

A video camera with a VTR for recording/playback of images communicates with a camera/VTR station by means of an opto-electronic link. A first opto-electronic link operates when the camera is positioned away from the camera/VTR station, and a second opto-electronic link operates when the camera is positioned on the camera/VTR station. The first opto-electronic link operates when the video camera does not record.

8 Claims, 37 Drawing Sheets

FIG. I

VIDEO CAMERA

This application is a 37 CFR §1.60 divisional of prior application Ser. No. 08/027,940, filed Mar. 8, 1993, U.S. Pat. No. 5,565,919.

BACKGROUND OF THE INVENTION

The present invention relates to a video camera.

Literature relevant to the present invention is as follows: JP-A Hei 1-98373; JP-A Hei 1-142539; JP-A Hei 3-198480; JP-A Hei 2-210973; JP-A Hei 3-206777; JP-A Hei 3-292067; JP-A Hei 2-39011; JP-A Hei 1-261086; JP-A Hei 3-33710; JP-A Sho 63-223720; JP-A Hei 1-32217; Optics Technical Handbook, ASAKURA SHOTEN, pp. 863–866 (1970); and U.S. Pat. No. 5,048,939.

SUMMARY OF THE INVENTION

A first object of the present invention is to provide a compact video camera in which camera shaking is reduced on the basis of arrangement of parts.

A second object of the present invention is to provide a compact video camera in which the image pickup range of a zoom lens is displayed equivalently by changing the size of a visual field frame variably.

A third object of the present invention is to provide a compact video camera having a predetermined time-shooting function for limiting the shooting time to a predetermined time to thereby reduce both redundancy of reproduced images and necessity of edition.

A fourth object of the present invention is to provide an electronically zooming video camera lens in which the distance between lens elements of the zoom lens required to secure a necessary magnification can be set to be short, so that not only the lens can be reduced in size but the electronic zoom can be used effectively in a magnification range in which deterioration of the quality of image caused by the use of the electronic zoom is not remarkable.

A fifth object of the present invention is to provide a compact video camera improved on the difficulty of handling properties to attain the true easiness of handling properties not only from the point of view of video-photographing but from the point of view of reproduction and preparation before photographing.

A sixth object of the present invention is to provide a compact video camera in which a primary battery (dry battery) and a secondary battery (storage battery) can be used mixedly while battery charging is prohibited in the case of use of the primary battery.

The present invention described in claims is proposed to achieve at least one of the foregoing objects.

BRIEF DESCRIPTION OF THE DRAWINGS

These and other objects and technical advantages of the present invention will be readily apparent from the following description of the preferred exemplary embodiments of the invention in conjunction with the accompanying drawings, of which.

DESCRIPTION OF THE PREFERRED EMBODIMENTS

Figure 1:
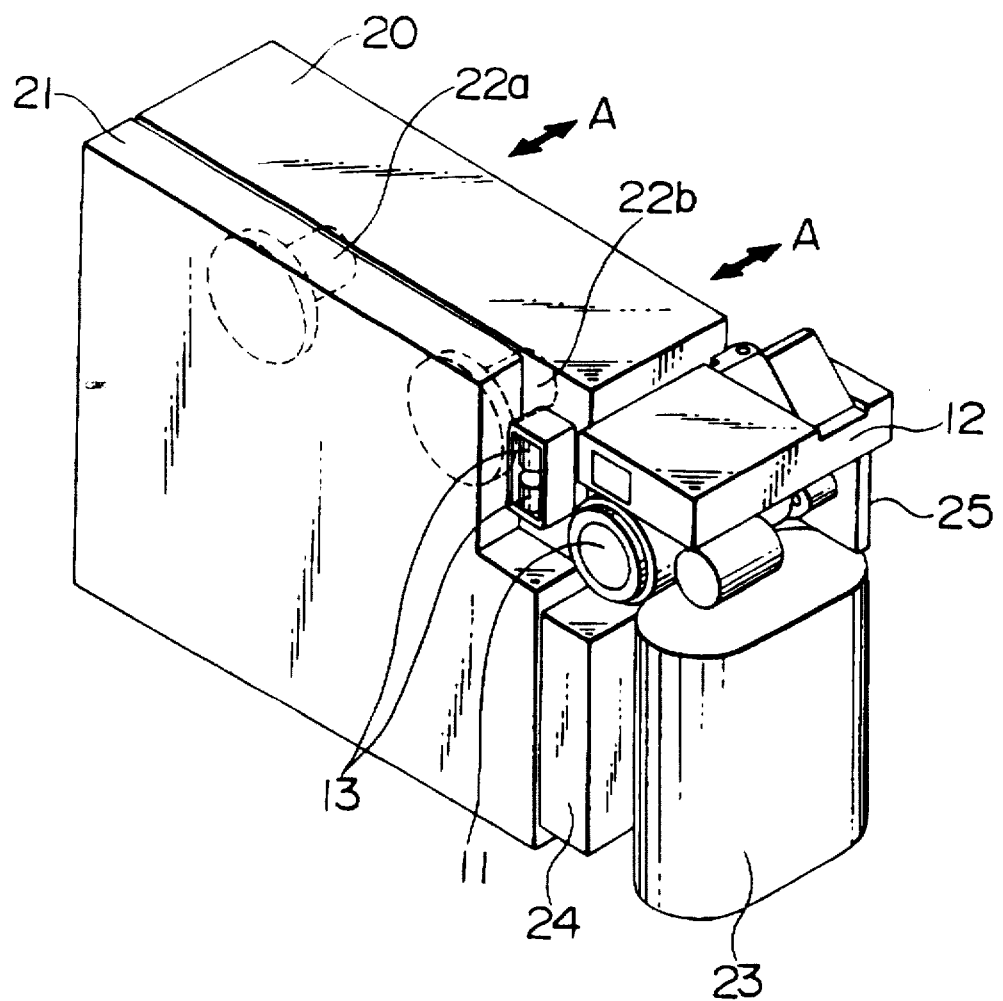
FIG. 1 is a perspective view showing the arrangement of internal parts of a video camera system as an embodiment according to the present invention, seen from the front thereof.
Figure 2:
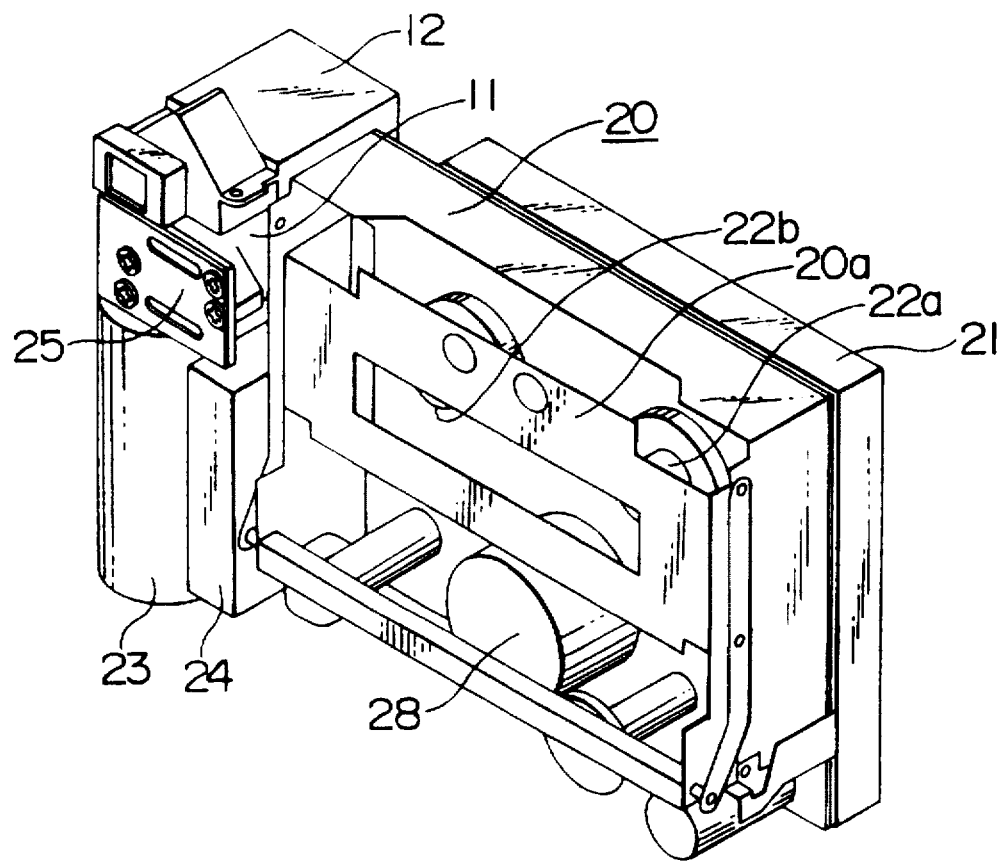
FIG. 2 is a perspective view showing the arrangement of internal parts of the system of the embodiment according to the present invention, seen from the rear thereof.
Figure 3:
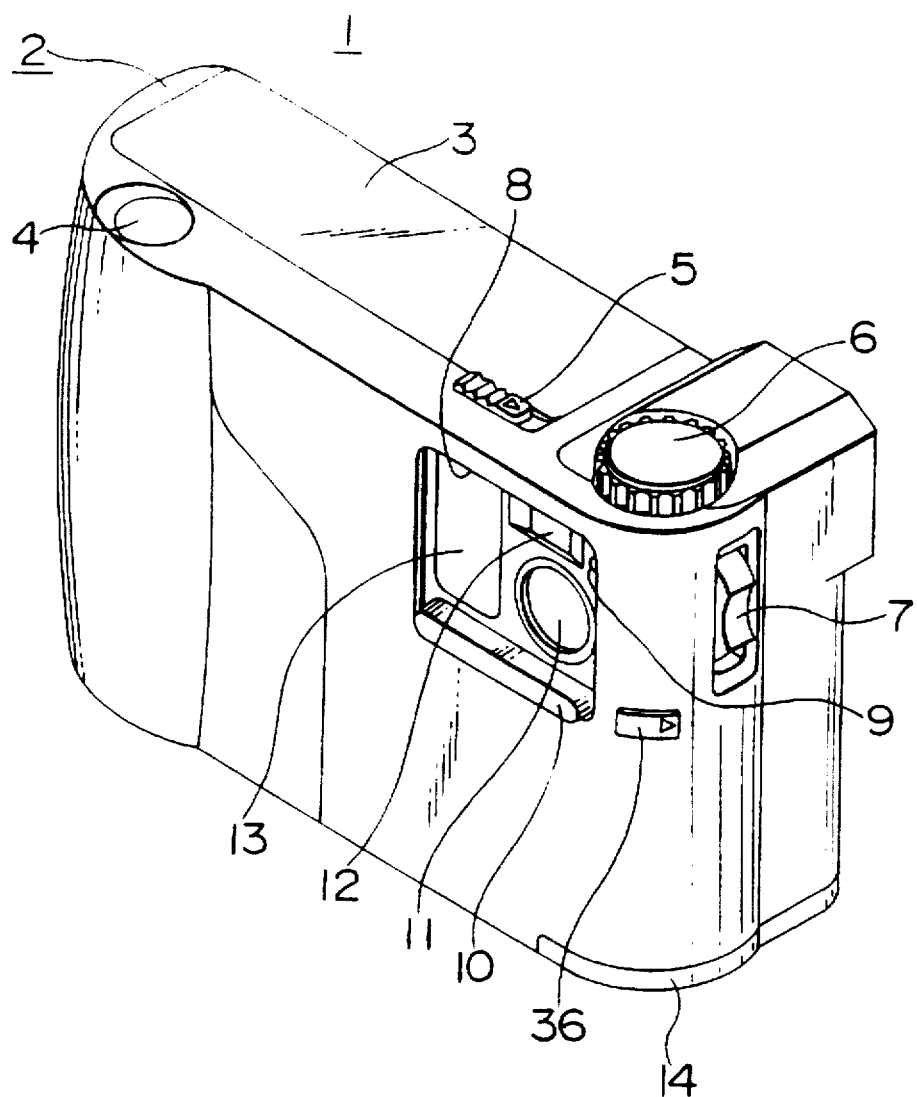
FIG. 3 is a view showing the external appearance of the system depicted in FIG. 1, seen from the front thereof after covering the system with a casing.
Figure 4:
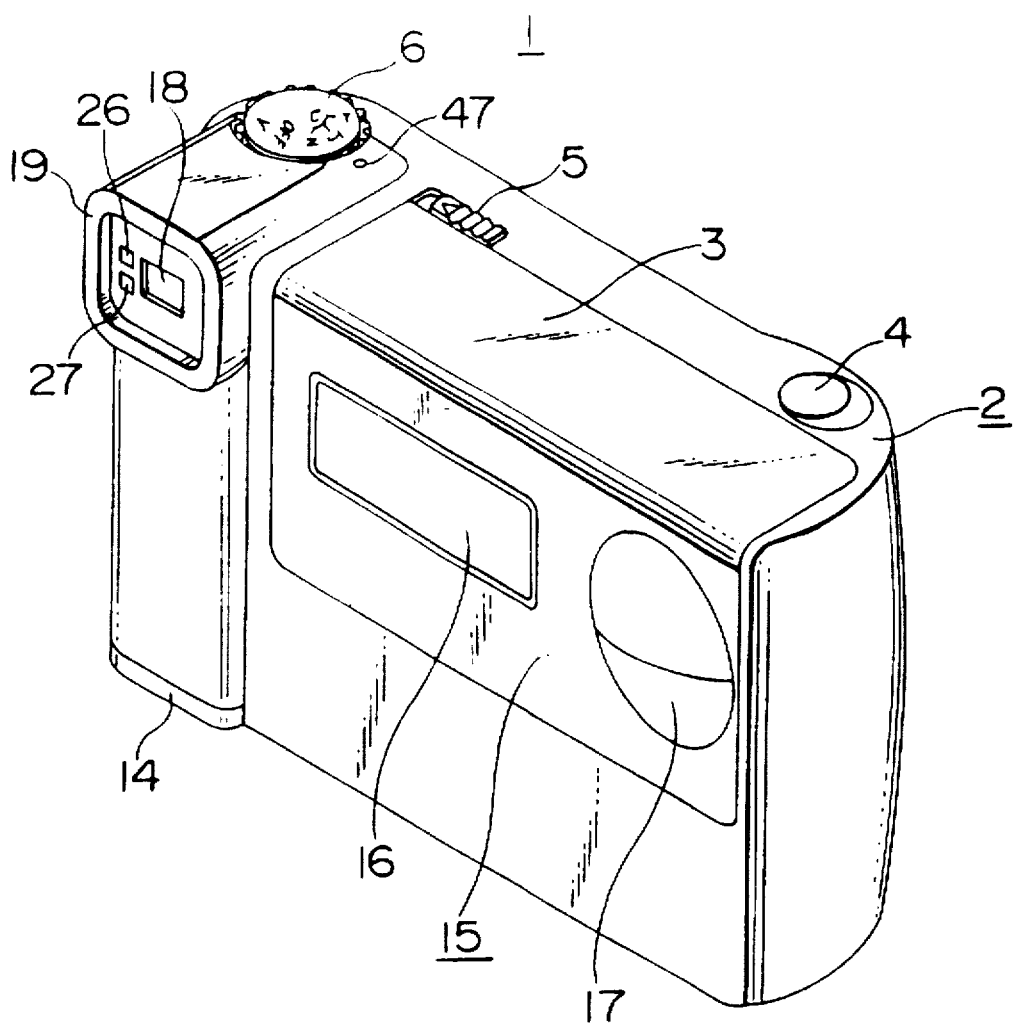
FIG. 4 is a view showing the external appearance of the system depicted in FIG. 2, seen from the back thereof after covering the system with the casing.

A video camera system as a first embodiment of the present invention is shown in FIGS. 1, 2, 3 and 4. FIG. 1 is a view showing the external appearance of internal parts of the system seen from the front thereof after removing a casing 2 from the system; FIG. 2 is a view showing the external appearance of internal parts of the system seen from the back thereof after removing the casing 2 from the system; FIG. 3 is a view showing the external appearance of the system, as a VTR-including video camera system 1, seen from the front thereof; and FIG. 4 is a view showing the external appearance of the system seen from the back thereof. In FIGS. 1 and 2, the compact video camera system 1 according to the present invention comprises a VTR mechanism 20, a VTR circuit 21 disposed in the front of the VTR mechanism 20, a microphone 13 disposed in the front of the VTR mechanism 20, an optical viewfinder 12 disposed in a side of a VTR portion constituted by the VTR mechanism 20 and the VTR circuit 21, a video camera lens 11 disposed in the lower of the optical viewfinder 12, a battery 23 disposed in the lower of the video camera lens 11, and a video camera circuit 24. An image pickup element 25 is attached to the back of the video camera lens 11. Tape takeup shafts 22a and 22b, a cylinder 28 and a cassette holder 20a are put in the VTR mechanism 20. The tape takeup shafts 22a and 22b of the VTR mechanism 20 are positioned in a direction of the arrow A. The optical axis of the video camera lens 11 and the optical axis of the optical viewfinder 12 are parallel with the direction of the arrow A. The VTR mechanism 20, the optical viewfinder 12, the video camera lens 11 and the battery 23 are disposed side by side on one plane so that they do not overlap on each other. A tape cassette (not shown) is mounted into the cassette holder 20a. The tape cassette is fitted onto the tape takeup shafts 22a and 22b so that a tape (not shown) is rolled on the cylinder 28.

A primary battery (dry battery) is used as the battery 23. Dry batteries are available anywhere recently and have no need to be subjected to battery charging, unlike secondary batteries (storage batteries).

In FIGS. 3 and 4, the compact video camera system 1 according to the present invention is packed in the casing 2. The casing 2 has an opening portion 8 at its front. The video camera lens 11, the optical viewfinder 12, the microphone 13 and a tarry lamp 9 are disposed in the opening portion 8. The opening portion 8 is opened/shut by a shielding plate 10. A shielding plate releasing knob 36 is disposed in the oblique lower of the opening portion 8. When the shielding plate releasing knob 36 is pulled, the shielding plate 10 moves up to shield the opening portion 8. An image recording switch 4, an eject switch 5, a mode changeover switch 6 and a top cover 3 are disposed at the upper of the casing 2. A zoom switch 7 is disposed at a side of the casing 2. The image recording switch 4 is used for setting the start or end of image recording. The eject switch 5 is a slide switch type. When the eject switch 5 is pulled, the top cover 3 and a cassette lid 15 are opened so that the cassette tape (not shown) can be taken out/in. The mode changeover switch 6 serves to change the photographing mode. The mode changeover switch 6 will be described later in detail. A battery lid 14 is disposed in the lower surface of the casing 2, so that the battery 23 is taken out/in through opening of the battery lid 14. The cassette lid 15 and a viewfinder ocular portion 18 are disposed in the back surface of the casing 2. An eyecup 19 is formed so as to surround the viewfinder ocular portion 18. A power indicator 26 and a recording indicator 27 are disposed in the inner side of the eyecup 19. The cassette lid 15 has a liquid crystal display portion 16 for displaying the operation state of the compact video camera 1. A finger stopper 17 is formed in the right portion of the cassette lid 15 so as to be protuberant from the cassette lid 15. The finger stopper 17 serves to prevent the right-hand thumb from slipping when the video camera 1 is gripped in the right hand. The cassette tape (not shown) to be mounted to the VTR mechanism 20 is taken out/in from the top cover 3 disposed in the upper portion of the system and the cassette lid 15 disposed in the back surface of the system. The eyecup 19 serves to prevent impedimental external light from entering into the viewfinder ocular portion 18 when a cameraman looks in at the viewfinder ocular portion 18. The power indicator 26 is lighted when the mode changeover switch 6 is selected to a CAMERA mode (C) or a VTR mode (V). It is preferable that the color of light of the power indicator 26 is red. The recording indicator 27 is lighted when the image recording switch 4 is turned on to the image recording side in the condition in which the mode changeover switch 6 is selected to a CAMERA mode. It is preferable that the color of light of the recording indicator 27 is green or blue. In a J-photographing mode (just photographing mode) which will be described later, the recording indicator 27 goes on and off to indicate the passage of time. It is preferable that the turning-on-and-off cycle of the recording indicator in this mode is 1 sec.

Figure 5:
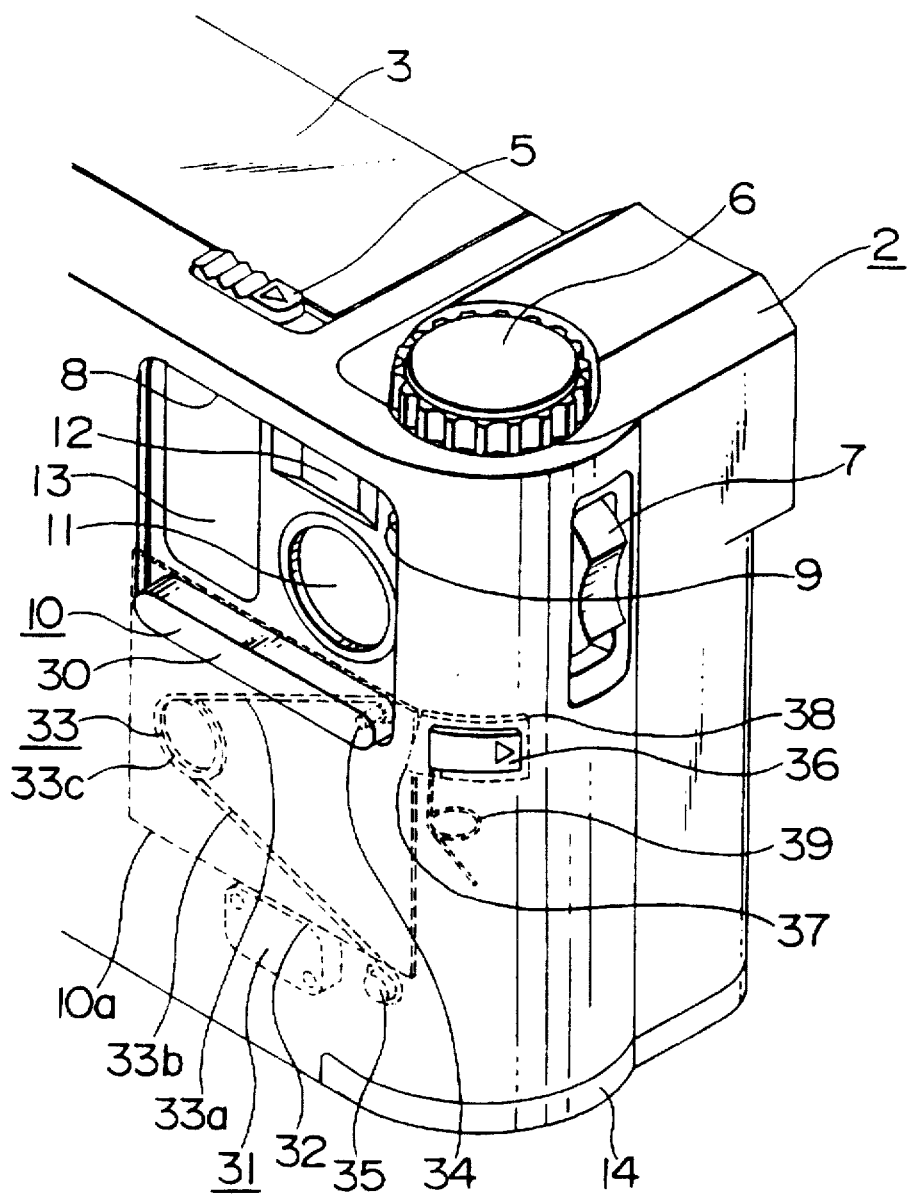
FIGS. 5 and 6 are perspective views showing the structure of a shielding plate.
Figure 6:
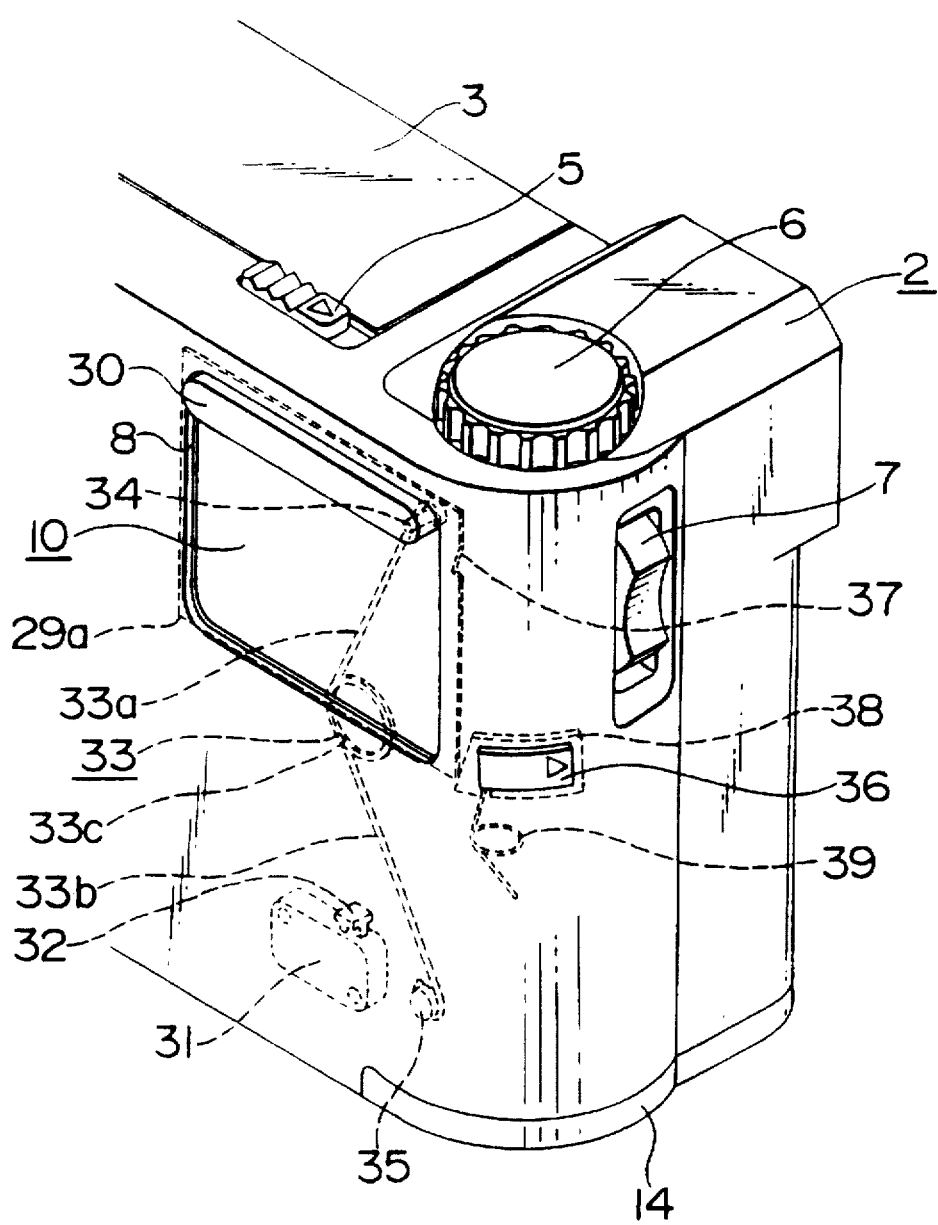

FIGS. 5 and 6 show the structure and operation of the shielding plate 10 for shielding the opening portion 8 of the casing 2. A shielding plate slide knob 30 is fixed to the shielding plate 10 at the upper end of the shielding plate 10. The opening/shutting mechanism of the shielding plate 10 is constituted by the shielding plate 10 and a torsion coiled spring 33 engaged with an inner surface 29a of the shielding plate 10. The torsion coiled spring 33 has one end pivotally supported on a screw 34, another, opposite end 33b pivotally supported on a projection 35 of the casing 2, and a coiled portion 33c which is not fixed but free. The shielding plate 10 is vertically slidably held in the casing 2. The torsion coiled spring 33 continuously gives an upward force to the shielding plate 10. The shielding plate 10 has a notch 37 at its side end portion. A stoppage hook 38 united with the shielding plate releasing knob 36 into one body which is movable, is engaged with the notch 37. A releasing knob urging spring 39 continuously urges the stoppage hook 38 the notch 37 toward the shielding plate 10. An electric source switch 31 is disposed in the lower of the shielding plate 10 so as to be attached to the casing 2. An an electric source switch knob 32 is brought into contact with the lower end portion 10a of the shielding plate 10 and pressed down so that the electric source is turned on as shown in FIG. 5. When the shielding plate releasing knob 36 is slid against the force of the releasing knob urging spring 39, the stoppage hook 38 is disengaged from the notch 37 of the shielding plate 10 so that the shielding plate 10 is moved up by the force of the torsion coiled spring 33 to thereby shield the opening portion 8. Upon movement of the lower end portion 10a of the shielding plate 10 upward, the force pressing down the electric source switch knob 32 is eliminated so that the electric source is turned off.

As shown in FIG. 4, the CAMERA mode set by the mode changeover switch 6 may be further classified into three photographing modes, namely, normal mode (N), just mode (J) and toggle mode (T). In the case where the normal mode (N) is adjusted to coincide with an indication 47, image recording is performed only when the image recording switch 4 is pushed continuously, and the image recording is terminated when the image recording switch 4 is released. In the case of the just mode (J), image recording is performed for a predetermined time (for example, 5 seconds) when the image recording switch is pushed once, and the image recording is automatically terminated. In the case of the toggle mode (T), image recording is started when the image recording switch 4 is pushed once, the image recording is continued even if the image recording switch 4 is released, and the image recording is terminated when the image recording switch 4 is pushed once more. The operation in the just mode (J) is carried out by a micro-computer incorporated in the video camera system.

Figure 7:
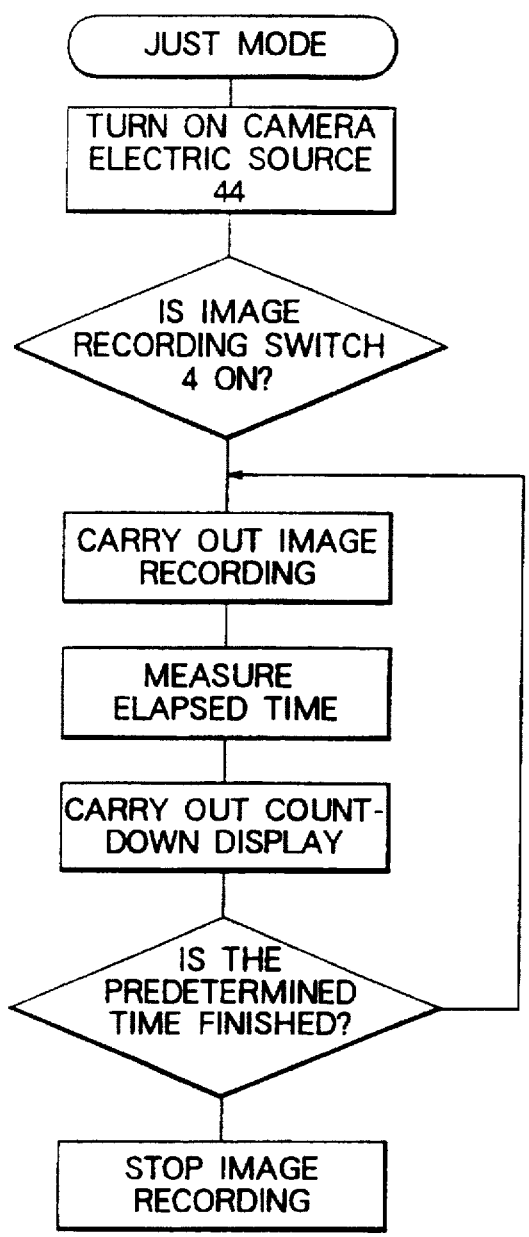
FIG. 7 is a flow chart showing a just-mode operation.

A flow chart of the operation in the just mode (J) is shown in FIG. 7. When the mode changeover switch 6 is adjusted to coincide with the just mode (J), a camera electric source switch 44 is turned on. When the image recording switch 4 is pushed, image recording is started. The elapsed time is measured so that the measurement result is indicated by count-down display (which will be described later). When a predetermined time passes, the image recording is stopped.

The optical system in the video camera system of this embodiment will be described below.

Figure 8:
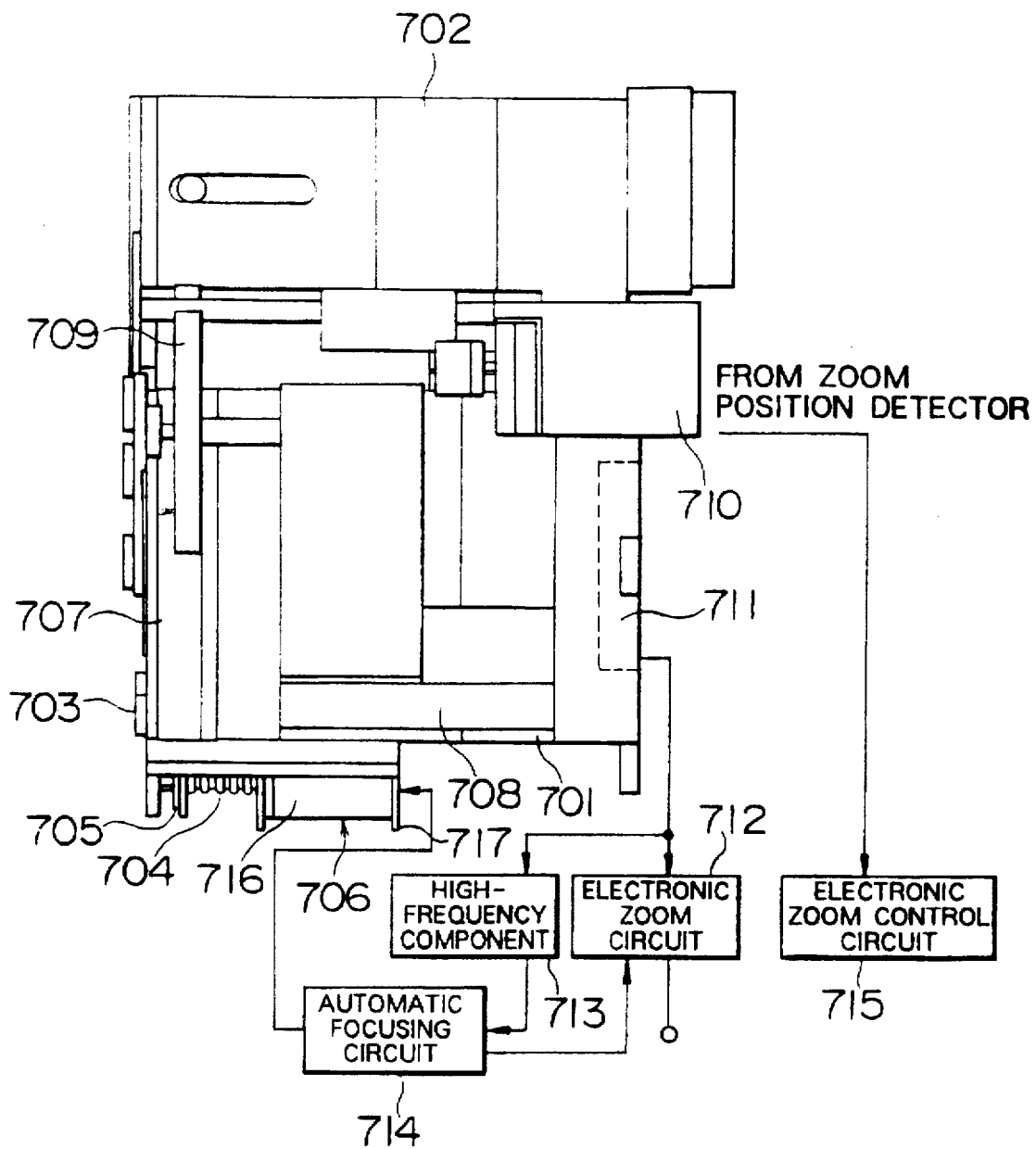
FIG. 8 is a side view of an optical system in the video camera system of the embodiment.

FIG. 8 is a side view showing an embodiment of the video camera system. In the drawing, the reference numeral 701 designates a zoom lens, 702 an optical finder, 703 a focusing link, 704 a spring, 705 an iron core, 706 a latch solenoid, 707 a cam ring, 708 a zoom motor, 709 a zoom gear, 710 an iris motor, 711 an image pickup element, 712 an electronic zoom circuit, 713 a high-frequency component extraction circuit, 714 an automatic focusing circuit, 715 an electronic zoom control circuit, 716 an electromagnet, and 717 a permanent magnet.

Figure 9:
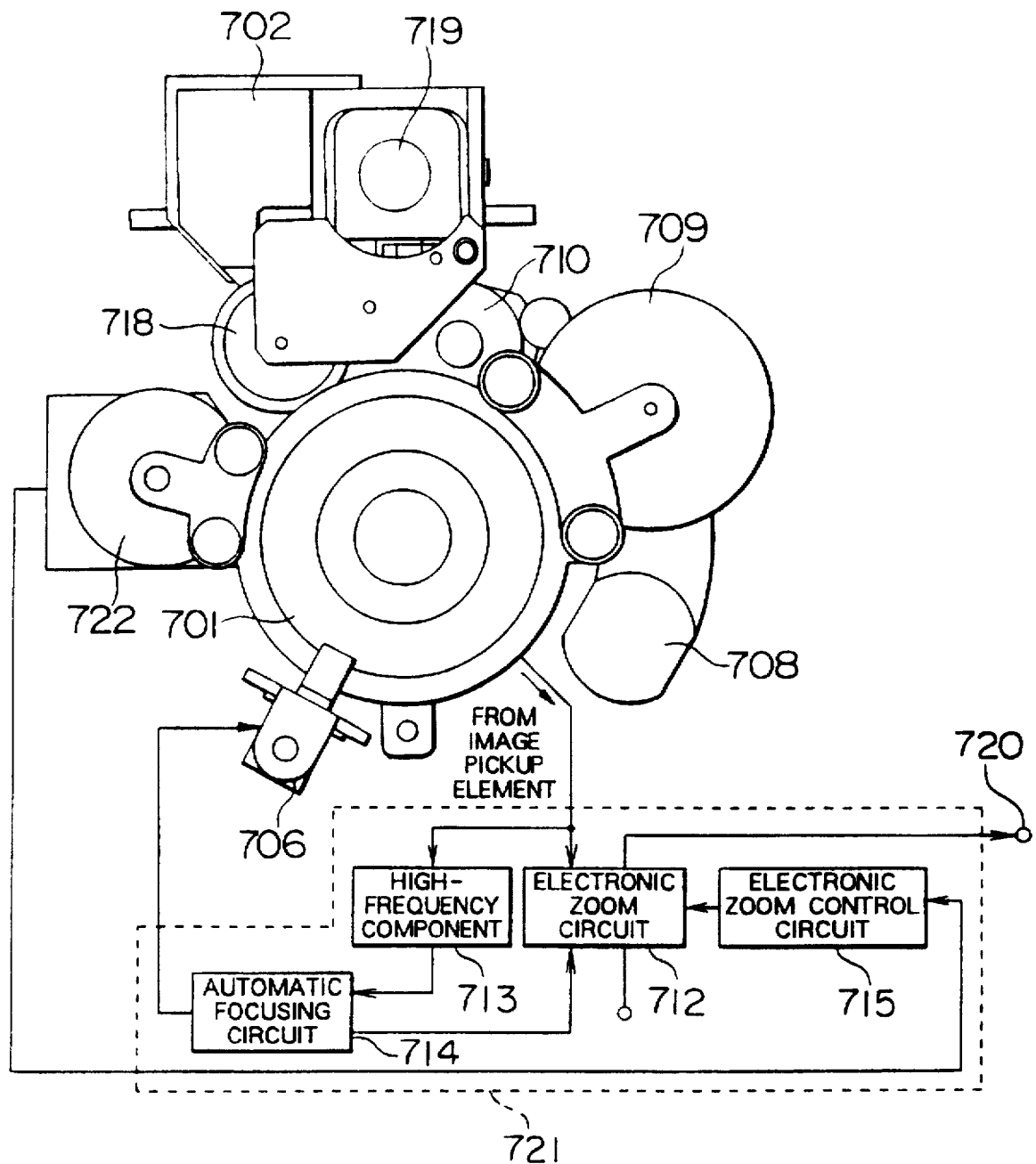
FIG. 9 is a front view of the same.

FIG. 9 is a front view of this embodiment of the video camera system seen from the left in FIG. 8. In the drawing, the reference numeral 718 designates a finder cam ring, 719 a lens, 720 an output terminal, 721 a camera circuit, and 722 a zoom position detector. In each of FIGS. 8 and 9, like numerals refer to like parts.

In FIGS. 8 and 9, the video camera system of this embodiment has the zoom lens 701, the optical finder 702, and the electronic zoom circuit 712. The zoom lens 701 is constituted by a plurality of lens elements. Among the plurality of lens elements, a focusing lens element is connected to the focusing link 703. The focusing link 703 is urged unidirectional by the spring 704, so that the focusing link 703 moves when the iron core 705 is driven by the latch solenoid 706 constituted by the permanent magnet 717 and the electromagnet 716. With the movement of the focusing link 703, the focusing lens element moves so that focusing is performed.

Among the plurality of lens elements in the zoom lens 701, a zooming lens element is connected to the cam ring 707 of the zoom lens 701. When the cam ring 707 rotates, the zooming lens element moves so that the focal length of the zoom lens 701 is changed. The cam ring 707 is connected through the zoom gear 709 to the zoom motor 708, so that the focal length of the zoom lens 701 can be changed by the operation of the zoom motor 708.

The lens opening value of the zoom lens 701 is changed by driving the iris motor 710.

An optical image of a subject (not shown) is formed on the image pickup element 711 through the zoom lens 701. The image pickup element 711 converts the optical image into an electric signal and outputs the electric signal as a video signal. The video signal is supplied to the electronic zoom circuit 712 in the camera circuit 721, so that a portion within a variable extraction range which is preliminarily set is extracted from the video signal and expanded with respect to time. The extracted and expanded signal is outputted at the output terminal 720. By this means, a subject image determined by this subject image extraction range to be picked up by the image pickup element 711 can be magnified, that is, so-called electronically zooming can be performed.

The video signal outputted from the image pickup element 711 is also supplied to the high-frequency component extraction circuit 713 in the camera circuit 721 so that the high-frequency component is extracted from the video signal. The automatic focusing circuit 714 detects a focusing state from the high-frequency component and supplies a focusing control signal to the latch solenoid 706. The latch solenoid 706 is driven so that the high-frequency component outputted from the high-frequency component extraction circuit 713 is in its maximum value, by which the focusing lens element of the zoom lens 701 is positioned so that the best focusing state can be obtained.

The zoom position detector 722 which is engaged with the cam ring 707 of the zoom lens 701, detects the angle of rotation of the cam ring 707 as a resistance value and outputs the detection result. The electronic zoom control circuit 715 controls both the extraction range set in the electronic zoom circuit 712 correspondingly to the detection result of the zoom position detector 722 and the ratio of expansion with respect to time, of the video signal extracted within the extraction range, by which the image magnification ratio of the electronic zoom circuit 712 is changed.

The finder cam ring 718 which is engaged with the cam ring 707, moves the lens 719 of the optical finder 702 correspondingly to the rotation angle thereof to thereby change the image magnification ratio of the optical finder 702.

In the above-mentioned configuration, the focal length of the zoom lens 701 can be changed within a range of from 5 mm to 15 mm, and the F value of the zoom lens 701 indicating the brightness of the lens is set to F=3 when the focal length of the zoom lens 701 is 15 mm. The effective image pickup range of the image pickup element 11 is 3.6 mm long and 4.8 mm broad, that is, 6 mm long diagonally. The electronically zooming magnification ratio of the electronic zoom circuit 712 is from 1 to 2 as the image magnification ratio.

Figure 10:
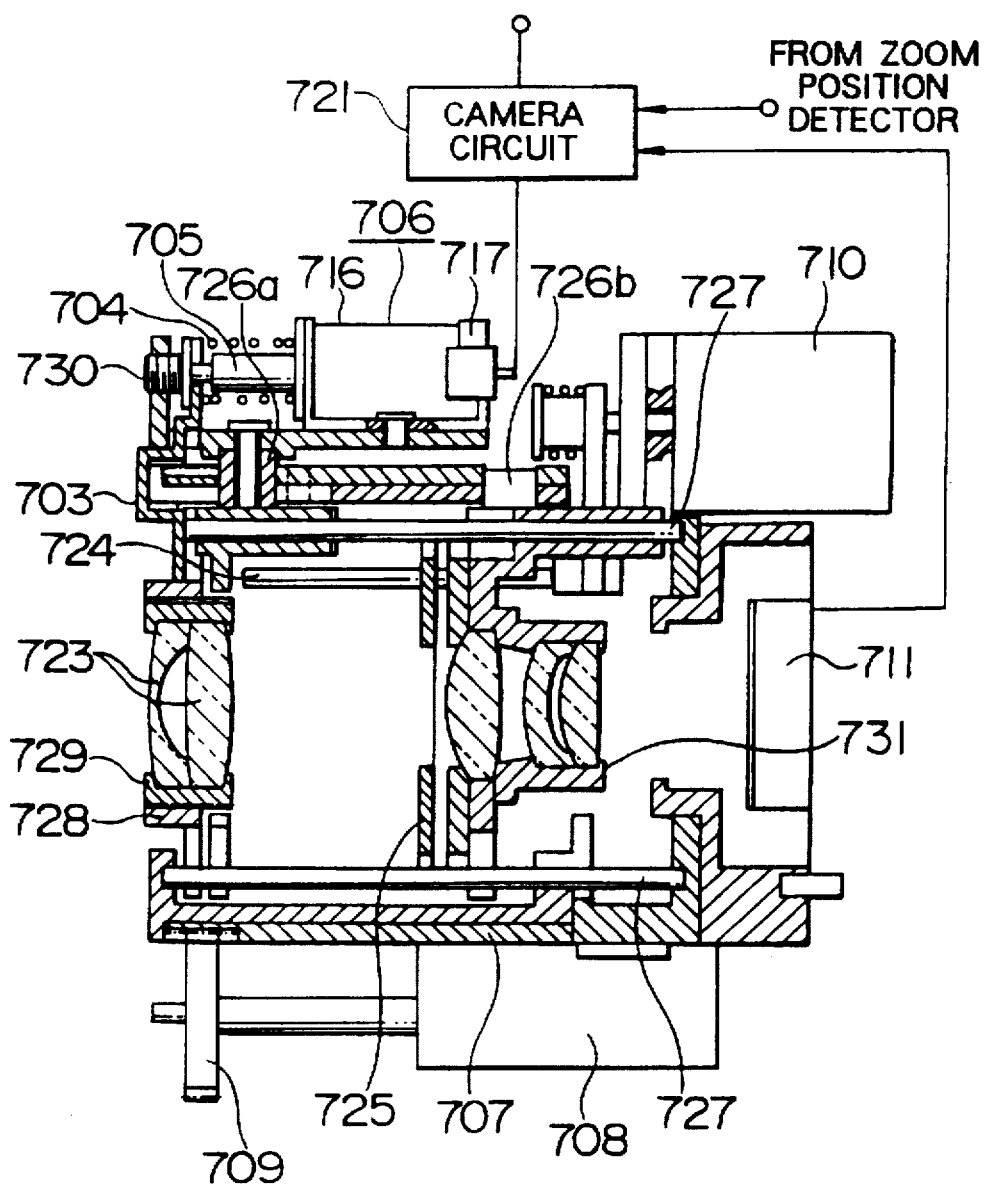
FIG. 10 is a sectional view of important part of the same.

FIG. 10 is a vertical sectional view showing the inside structure of the video camera system depicted in FIGS. 8 and 9. In FIG. 10, the reference numeral 723 designates a front-group lens set, 724 a link, 725 an iris, 726a and 726b cam followers, 727 a rod, 728 a front movable frame, 729 a front group, 730 a screw, and 731 a rear group. In each of the above drawings including FIG. 10, like numerals refer to like parts.

Figure 11:
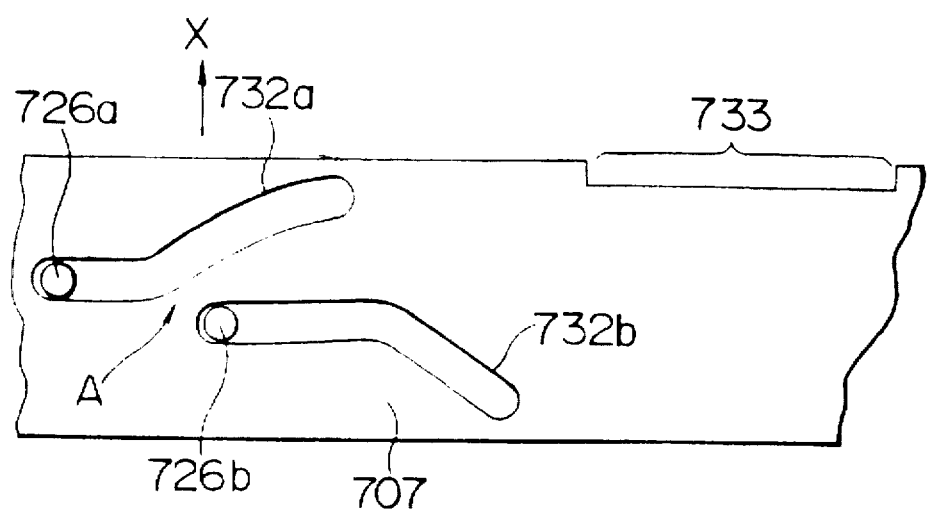
FIG. 11 is a development view showing the respective shapes of cam grooves provided in a cam ring.

In FIG. 10, the front group 729 which holds the front-group lens set 723 in its inside is engaged with the front movable frame 728 which is fastened to the focusing link 703 so as to be movable along the rod 727. The cam followers 726a and 726b are fixed to the front movable frame 728 and the rear group 731 holding a rear-group lens set, respectively. As shown in FIG. 11, the cam followers 726a and 726b are inserted into cam grooves 732a and 732b, respectively, provided in the cam ring 707. A limiting groove 733 for limiting the angle of rotation of the cam ring 707 is provided in the cam ring 707. FIG. 11 also shows the respective positions of the cam followers 726a and 726b in the case where the total zooming magnification ratio of the video camera system and the image magnification ratio of the optical finder 702 are in their maximum values respectively.

In FIG. 10 the link 724 is rotated by means of the iris motor 710, so that the iris 725 performs an opening/shutting operation in response to the rotation of the link 724. Further, the screw 730 is disposed so that it can be brought into contact with the iron core 705.

Figure 12:
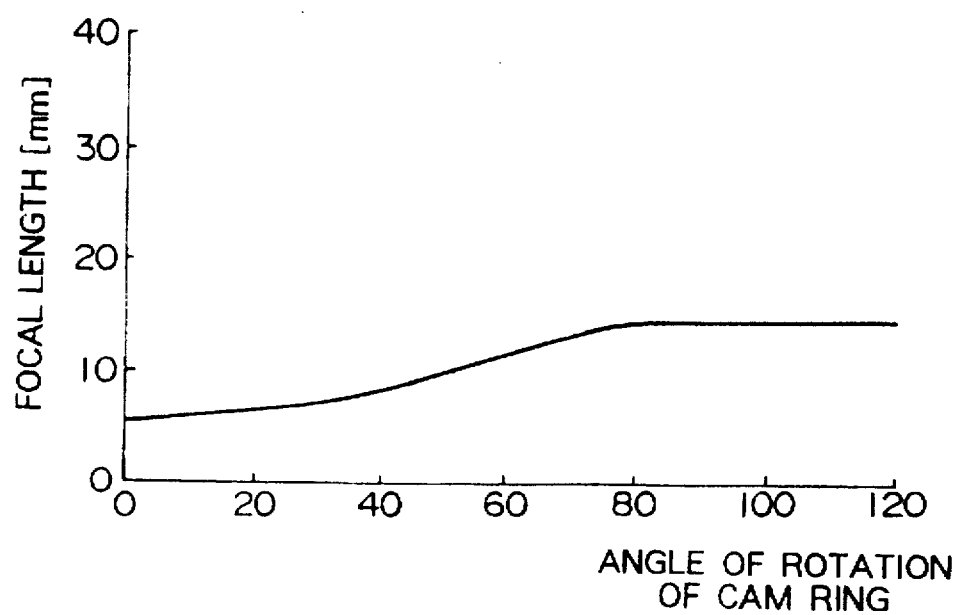
FIG. 12 is a graph view showing the change of the focal length of a zoom lens versus the angle of rotation of the cam ring in the embodiment.

FIG. 12 shows the change of the focal length of the zoom lens 701 with respect to the angle of rotation of the cam ring 707 in the case where the range of the change of the focal length of the zoom lens 701 obtained by lens movement through rotation of the cam ring 707 is set to a range of from 5 mm to 15 mm.

In FIG. 11, assume now that the focal length increases as the cam ring 707 rotates right with an axis parallel to the direction of the arrow X as a center of rotation. Assume further that the focal length of the zoom lens 701 is 15 mm when the cam followers 726a and 726b are placed in the left of points A of the cam grooves 732a and 732b respectively. As is obvious from FIG. 12, the angle of rotation of the cam ring 707 is about 80° when the cam followers 726a and 726b are placed just on the points A of the cam grooves 732a and 732b respectively. When the angle of rotation of the cam ring 707 is 0° (the cam followers 726a and 726b are placed in the respective right ends of the cam grooves 732a and 732b), the focal length is 5 mm.

Although the cam ring 707 can be rotated even when the focal length of the zoom lens 701 exceeds 15 mm, the cam follower 726b does not move in any more the direction of the optical axis represented by the arrow X because the cam grooves 732a and 732b provided in the cam ring 707 extend in the directions of the circumference of the cam ring 707 from the points A. Accordingly, because both the front movable frame 728 and the rear group 731 do not move any more, the lens position is settled so that the focal length is kept in its maximum value.

Figure 13:
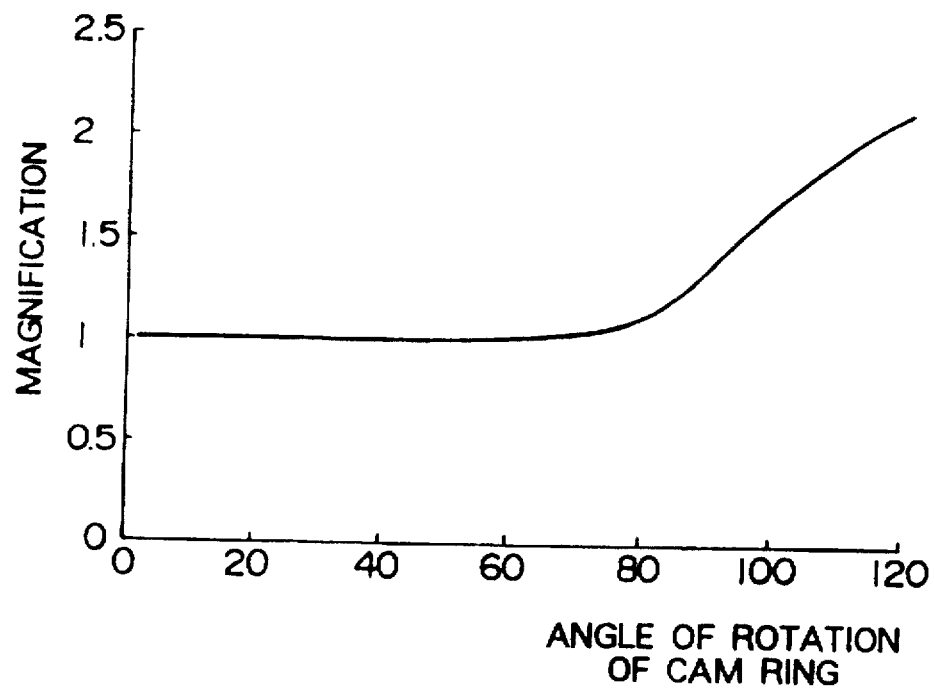
FIG. 13 is a graph view showing the change of the image magnification ratio of an electronic zoom circuit versus the angle of rotation of the cam ring in the embodiment.

In FIGS. 8 and 9, the electronic zoom control circuit 715 changes the image magnification ratio of the electronic zoom circuit 712 correspondingly to the angle of rotation of the cam ring 707 detected by the zoom position detector 722. This will be described below with reference to FIG. 13. In FIG. 13, the axis of ordinates represents the image magnification ratio of the electronic zoom circuit 712, and the axis of abscissas represents the angle of rotation of the cam ring 707.

Herein, the image magnification ratio of the electronic zoom circuit 712 is set so as to be continuously changed from 1 to 2 when the cam ring 707 is rotated over the angle of 80° to make the focal length of the zoom lens 701 exceed 15 mm.

Figure 14:
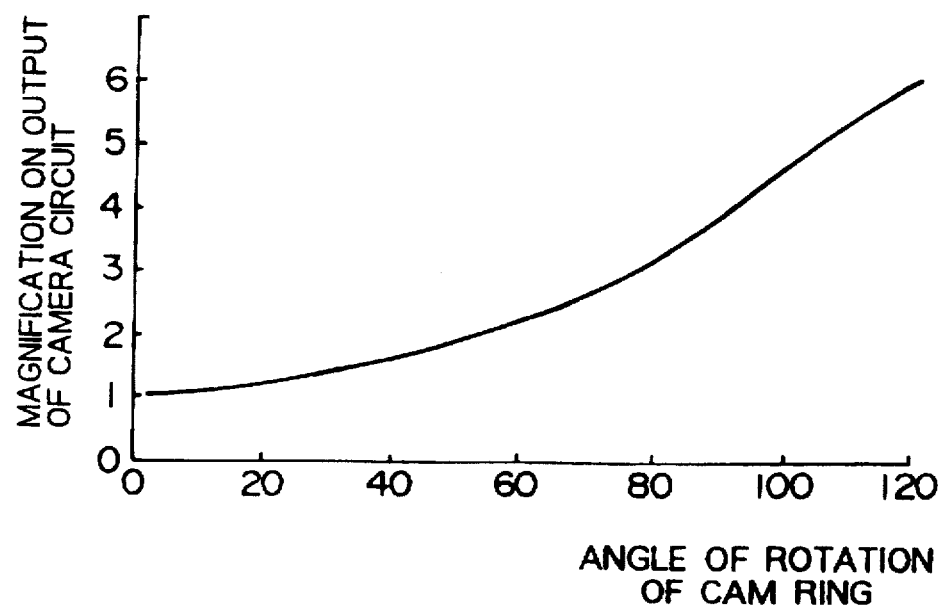
FIG. 14 is a graph view showing the change of total image magnification ratio versus the angle of rotation of the cam ring in the embodiment.

Image magnification ratio due to the video signal outputted at the output terminal 720 from the camera circuit 721 is total image magnification ratio based on the magnification ratio of the zoom lens 701 and the magnification ratio (image magnification ratio) of the electronic zoom circuit 712, as shown in FIG. 14.

The structure of the optical system may be modified so that an image magnified by the electronic zoom circuit is magnified by the optical zoom lens.

FIG. 14 shows the size of an image (that is, total magnification ratio as described above) due to the video signal obtained at the output terminal 720 correspondingly to the angle of rotation of the cam ring 707 in the case where the same subject is photographed in the same condition on the assumption that the image size (corresponding to the angle of rotation of the cam ring 707 of 0°) is 1 when the focal length of the zoom lens 701 is 5 mm. As is obvious from FIG. 14, the magnification of the image obtained can be changed continuously from 1 to 6 when the cam ring 707 is rotated continuously.

Figure 15:
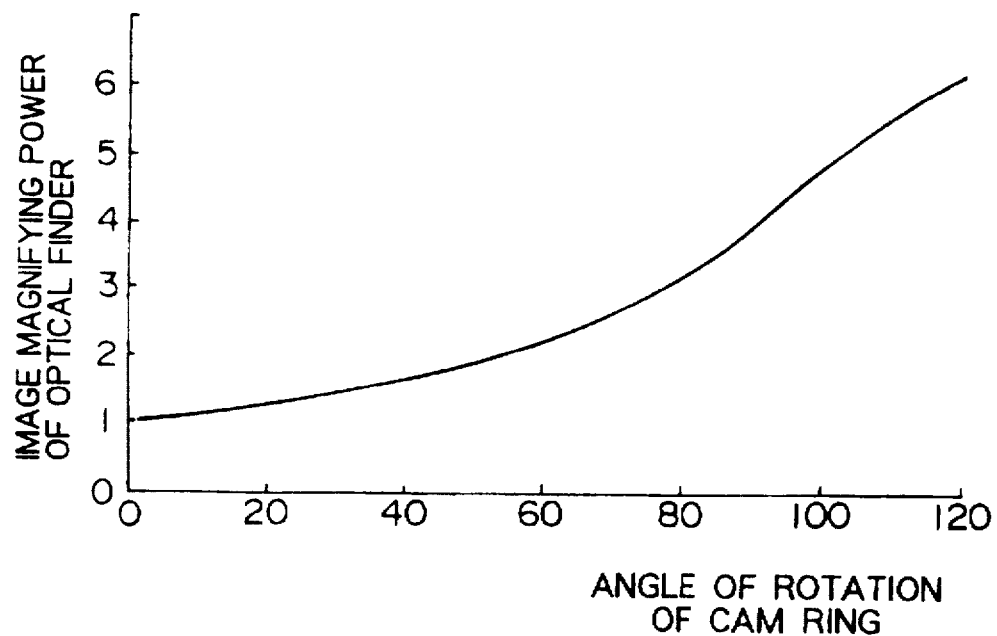
FIG. 15 is a graph view showing the change of the image magnification ratio of the optical finder depicted in FIG. 1, versus the angle of rotation of the cam ring in the embodiment.

On the other hand, the image magnification ratio of the optical finder 702 is changed when the lens 719 of the optical finder 702 is moved by means of the finder cam ring 718 in response to the rotation of the cam ring 707. FIG. 15 shows the change of the size of an image displayed in the optical finder 702 in accordance with the angle of rotation of the cam ring 707 on the assumption that the display image size of the optical finder 702 is 1 when the angle of rotation of the cam ring 707 is 00. In FIG. 15, as the angle of rotation of the cam ring 707 is changed continuously, the magnification of the image displayed in the optical finder 702 is changed substantially in the same manner as the image magnification ratio due to the video signal outputted from the camera circuit 721 shown in FIG. 14.

Although the characteristic of the change of image magnification ratio of the electronic zoom circuit 712 is as shown in FIG. 13, the electronic zoom circuit 712 is provided so that the midpoint of the video signal extraction range is changed in response to the change of the image magnification ratio. This midpoint will be described below with reference to FIG. 16.

Figure 16:
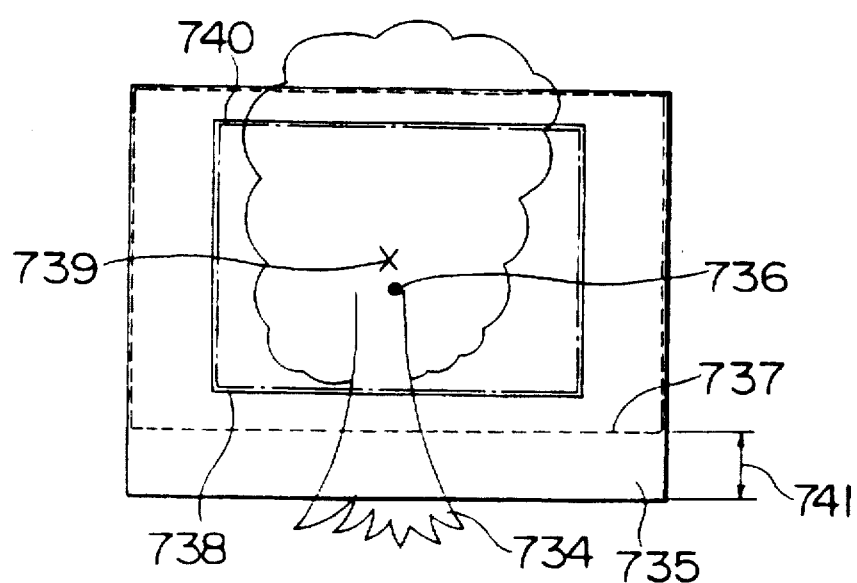
FIG. 16 is a view showing the relationship between the range of a subject image formed by the image pickup element and the range of a subject observed through the optical finder in the embodiment.

In FIG. 16, assume now that a range 735 shown by the solid line represents the range of a subject image formed on the image pickup element 711 in the case where the focal length of the zoom lens 701 with respect to a subject 734 is 15 mm. Assume further that a point 736 represents the midpoint of the range 735. Assume further that a range 737 shown by the broken line represents the range of the subject observed through the optical finder 702 in this condition. Then, the subject range 737 observed through the optical finder 702 is smaller by a range 741 than the subject image forming range 735.

The range of magnification by the electronic zoom circuit 712 and the midpoint thereof are changed continuously from the image forming range 735 on the image pickup element 711 corresponding to the focal length of the zoom lens 701 of 15 mm (point A in FIG. 11) and the midpoint 736 thereof, respectively, as the magnification ratio of the electronic zoom circuit 712 increases. When the magnification ratio of the electronic zoom circuit 712 reaches 2 which is its maximum (FIG. 13), the range of magnification by the electronic zoom circuit 712 and the midpoint thereof are changed to a range 738 shown by the solid line and a point 739, respectively. The subject range observed through the optical finder 702 is also changed continuously as the magnification ratio of the electronic zoom circuit 712 increases. That is, the subject range is changed from the range 737 (when the focal length of the zoom lens 701 is 15 mm) shown by the broken line to a range 740 (when the magnification ratio of the electronic zoom circuit 712 is in its maximum) shown by the dot-and-dash line.

The following problem is derived from the above-described fact.

That is, the zoom lens 701 and the optical finder 702 as two different optical systems have respective optical axes which are not identical. Accordingly, the midpoint of an image obtained through the zoom lens 701 and the midpoint of the subject range 737 observed through the optical finder 702 are changed respectively in accordance with the camera-to-subject distance, so that these midpoints do not coincide with each other. Because of the difference between the midpoints, the range of a subject image picked up by the image pickup element 711 and the range of a subject observed through the optical finder 702 do not coincide with each other. Accordingly, there arises a disadvantage that a subject observed through the optical finder 702 cannot be photographed.

In the case where the respective midpoints of the subject ranges of the zoom lens 701 and the optical finder 702 are adjusted to coincide with each other with respect to a subject at infinity (that is, in the case where the optical axes of the zoom lens 701 and the optical finder 702 are adjusted to coincide with each other at infinity), the quantity k (mm) of midpoint displacement on an image pickup plane of the image pickup element 711 is expressed by the equation:

$$k=(f \times x \times N)/L$$

when the distance between the zoom lens 701 and the subject is replaced by L (mm), the focal length of the zoom lens 701 is replaced by f (mm), the image magnification ratio of the electronic zoom circuit 712 is replaced by N, and the distance between the optical axis of the zoom lens 701 and the optical axis of the optical finder 702 is replaced by x (mm).

Assuming now that x and L are set to x=28 mm and L=1000 mm respectively, then k takes k=0.42 mm in the case of N=1 and f=15 mm, k takes k=0.14 mm in the case of N=1 and f=5 mm, and k takes k=0.84 mm in the case of the maximum magnification ratio N=2 and f=15 mm.

Therefore, the subject range 737 observed through the optical finder 702 in the case of the focal length f of the zoom lens 701 of 15 mm is preliminarily set to be smaller by the range 741 of 0.42 mm than the image forming range 735 of the image pickup element 711. By this measure, a video signal which covers all the subject image within the subject range 737 observed through the optical finder 702 is outputted from the image pickup element 711 when the focal length f of the zoom lens 701 is in a range of from 5 mm to 15 mm and the magnification ratio N of the electronic zoom circuit 716 is 1. In this case, there is no problem in practical use if the subject range 737 observed through the optical finder 702 is set to be not smaller than 80% of the range of the subject image picked up by the image pickup element 711.

In the case where the video signal from the image pickup element 711 is to be expanded with respect to time by the electronic zoom circuit 712 within a range limited by the electronic zoom circuit, the midpoint of the range of expansion is moved in a range of from 0 to 0.42 mm corresponding to the expansion ratio so that the output signal of the camera circuit 721 after the expansion of the image by the electronic zoom circuit 712 always contains the subject image observed through the optical finder 702.

As a result, all the image in the subject range observed through the optical finder 702 can be expressed by the video signal outputted from the camera circuit 721 regardless of the focal length of the zoom lens 701 and the image magnification ratio of the electronic zoom circuit 712, so that the subject observed through the optical finder 702 can be always photographed.

The focusing operation with respect to the subject in this embodiment will be described below.

The image forming state in which an image of the subject is formed on the image pickup element 711, changes in accordance with the camera-to-subject distance. Therefore, it is necessary to move lens elements of the zoom lens 701 to thereby perform focusing in accordance with the camera-to-subject distance. This focusing is carried out through the focusing link 703 driven by the spring 704 and the latch solenoid 706 through the iron core 705 in FIGS. 8 and 10.

The permanent magnet 717 is fixed to a rear end (right end in FIG. 8) of the inside of the latch solenoid 706. When the intensity of magnetic field due to the permanent magnet 717 is strengthened by application of an electric current to the electromagnet 716, the iron core 705 overcomes the force of the spring 704 and moves to the rear end of the inside of the latch solenoid 706. As a result, the front end (left end in FIG. 8) of the iron core 705 makes the focusing link 703 move toward the rear end (right end in FIG. 8). Thereafter, the movement of the iron core 705 is finished when the iron core 705 abuts on the permanent magnet 717, and as a result, the focusing link 703 stops. The focusing link 703 which is fixed to the front movable frame 728 in the zoom lens 701, makes the front group 729 and the front-group lens set 723 move together with the front movable frame 728. The direction and quantity of the movement thereof are respectively equal to the direction and quantity of the movement of the focusing link 703. In the zoom lens 701, the camera-to-subject distance can be changed through movement of the front-group lens set 723, so that the subject to be focused can be changed. Accordingly, the position of the subject to be focused by the zoom lens 701 can be determined as one position.

When an electric current is applied to the electromagnet 716 of the latch solenoid 706 so that a magnetic field can be produced in the electromagnet 716 to negate the magnetic field produced due to the permanent magnet 717, the iron core 705 is moved toward the front end (left in FIG. 8) by the action force of the spring 704 and stops when the iron core 705 abuts on the screw 730. When the position of the screw 730 is set suitably, the iron core 705 can stop at this position after moving toward the front end. With the movement of the iron core 705, the focusing link 703 is also moved by means of the spring 704, so that the front-group lens set 723 is moved together with the front movable frame 728 toward the front end (left end in FIG. 8). In this case, the quantity of the movement is determined in accordance with the position of the screw 730. When the stop position of the front-group lens set 723 is set to be a second focusing position by means of the screw 730, the position of the subject to be focused by the zoom lens 701 can be determined as a second position.

By the above-mentioned operation, the direction of electric current can be changed through application of an electric current to the latch solenoid 706 to thereby make it possible to select two positions of the subject to be focused by the zoom lens 701. At this time, by selecting the intensity of the spring 704, the intensity of magnetic field due to the permanent magnet 717 and the intensity of magnetic field produced by the electromagnet 716 suitably, the necessity of applying an electric current to the latch solenoid 706 after the setting of the front-group lens set 723 to a certain focusing position can be eliminated though the current applied to the latch solenoid 706 is required only for moving the front-group lens set 723.

The latch solenoid 706 is controlled by the automatic focusing circuit 714. A high-frequency component of the video signal outputted from the image pickup element 711 is supplied to the automatic focusing circuit 714. The automatic focusing circuit 714 supplies the latch solenoid 706 with an electric current for setting the front-group lens set 723 of the zoom lens 701 to a position where the quantity of the high-frequency component is in its maximum value. In this manner, the quantity of the high-frequency component of the video signal is maximized so that a focused image of the subject can be obtained.

In the case where the respective optical axes of the zoom lens 701 and the optical finder 702 are set to coincide with each other at infinity in the same manner as described above, it may be impossible to make the image displayed in the optical finder 702 coincide with the image based on the video signal outputted from the camera circuit 721 if the midpoint of the extraction range in the electronic zoom circuit 712 is moved in the same manner as described above when the subject is at infinity. Therefore, the automatic focusing circuit 714 controls the electronic zoom circuit 712 to forbid the above-described movement of the midpoint of the extraction range of the electronic zoom circuit 712 when the automatic focusing circuit 714 operates in accordance with the subject at infinity.

Having described the case where the focusing position of the front-group lens set 723 is set to an arbitrary position where the quantity of the high-frequency component of the video signal is maximized, the invention can be practically sufficiently applied to the case where two setting positions of the front-group lens set 723 are provided so that focusing can be performed by selecting therefrom a larger one in the quantity of the high-frequency component of the video signal than the other.

By the above-described operation, in this embodiment, an image of from one magnification to six magnifications with respect to a subject can be obtained in combination of the magnification ratio of the zoom lens 701 and the electronic magnification ratio of the electric zoom circuit 712. Accordingly, on one hand, this video camera system can operate in the same manner as a conventional video camera using a zoom lens, so that this system can be practically sufficiently focused on a subject. On the other hand, this video camera system can be also practically sufficiently focused on a subject in the case where the electronic zoom is in operation (that is, in the case of the magnification ratio of from 3 to 6). Furthermore, not only the magnification ratio of the optical finder can be set to be equal to the total magnification ratio of the zoom lens and the electronic zoom circuit, but a video signal of the same image as that observed through the optical finder can be outputted so that a subject image picked up can be checked visually without use of any special device such as a monitor television set.

Although the above embodiment has shown the case where focusing is carried out by movement of lens elements of the zoom lens 701, the invention can be applied to the case where focusing is carried out by movement of the position of the image pickup element 711. In the latter case, a latch solenoid may be used as a means for moving the image pickup element 711. Of course, two positions where focusing can be completed may be provided for the image pickup element.

As described above, according to the present invention, a zoom lens and an electronic zoom circuit are used in combination so that an image magnification ratio not less than the maximum image magnification ratio of the zoom lens can be obtained by the electronic zoom circuit. Accordingly, a larger image magnification ratio which cannot be obtained by the conventional video camera using a zoom lens singly, can be obtained by the video camera system according to the present invention. Further, in the present invention, a 3-fold magnifying power zoom lens can be used as the zoom lens when the image magnification ratio of the electronic zoom circuit is set to 2. That is, a small-size zoom lens can be used in the present invention compared with the conventional video camera mainly using a 6-fold magnifying power zoom lens. Accordingly, the size of the video camera can be reduced.

Furthermore, according to the present invention, an image in a subject range observed through the optical finder can be made to substantially coincide with an image based a video signal obtained. Accordingly, no special subject-watching device such as a monitor television set but the optical finder is required.

The structure of the optical viewfinder of this embodiment will be described below. This viewfinder has sufficient magnification ratio when it is adapted to a camera body which is thin in the direction of its optical axis as shown in FIG. 1.

An example of numerical values in the optical viewfinder is as follows.

| <<Example of Finder Numerical Values>> | | | | |
|---|---|---|---|---|
| S | r | d | N | v |
| 1* | 9.8903 | 2.82 | 1.49200 | 57.88 |
| 2* | −29.273 | variable | | |
| 3 | 118.64 | 1.00 | 1.49200 | 57.88 |
| 4* | 2.2301 | 1.9500 | | |
| 5 | −5.1175 | 1.00 | 1.49200 | 57.88 |
| 6* | −6.3123 | variable | | |
| 7 | −48.033 | 1.00 | 1.49200 | 57.88 |
| 8* | 7.1582 | variable | | |
| 9* | 6.2748 | 4.20 | 1.49200 | 57.88 |
| 10* | −6.1549 | 1.00 | | |
| 11 | 0.0 | 15.00 | 1.51680 | 64.20 |
| 12 | 0.0 | 7.4187 | | |
| 13 | 0.0 | 0.0 | | |
| 14 | 0.0 | 1.4903 | 1.49200 | 57.88 |
| 15* | 0.0 | 0.100 | | |
| 16 | 0.0 | 15.000 | 1.51680 | 64.20 |
| 17 | 0.0 | 0.0 | | |
| 18 | 25.417 | 3.6500 | 1.49200 | 57.88 |
| 19* | −8.5160 | 15.000 | | |
| 20 | 0.0 | −328.41 | | |

In the above table, r=0.0 means the fact that the diameter of curvature is infinitely great, that is, the fact that a plane is formed.

| Aspheric Surface Coefficients | |
|---|---|
| Surface S1: | $K = 0.3198957$ |
| | $A_4 = 7.9905571 + 10^5$    $A_6 = -5.3475478 + 10^6$ |
| | $A_8 = 2.9742887 + 10^7$    $A_{10} = -8.0238349 + 10^9$ |
| Surface S2: | $K = -54.64559$ |
| | $A_4 = 1.3381154 + 10^4$    $A_6 = 2.6593332 + 10^6$ |
| | $A_8 = -2.0023585 + 10^7$   $A_{10} = 9.6589869 + 10^{10}$ |
| Surface S4: | $K = 1.6171070 + 10^2$ |
| | $A_4 = 6.1458391 + 10^3$    $A6 = 2.1236739 + 10^3$ |
| | $A_8 = -7.7408110 + 10^4$   $A10 = 8.5054373 + 10^5$ |
| Surface S6: | $K = 3.132076$ |
| | $A_4 = -2.6907029 + 10^3$   $A_6 = 1.9178184 + 10^4$ |
| | $A_8 = 2.0539517 + 10^5$    $A_{10} = -1.9487412 + 10^5$ |

-continued

| Aspheric Surface Coefficients | |
|---|---|
| Surface S8: | $K = -.8858749$ |
| | $A_4 = -8.0499932 \div 10^4$  $A_6 = -1.6838676 \div 10^4$ |
| | $A_8 = 2.2770950 \div 10^5$  $A_{10} = -7.9100965 \div 10^7$ |
| Surface S9: | $K = -2.053730$ |
| | $A_4 = -7.1201159 \div 10^4$  $A_6 = 2.9081054 \div 10^6$ |
| | $A_8 = 1.5796155 \div 10^7$  $A_{10} = -1.8745532 \div 10^9$ |
| Surface S10: | $K = -.3345641$ |
| | $A_4 = 4.4772521 \div 10^4$  $A_66 = -1.1247503 \div 10^5$ |
| | $A_8 = 5.7751407 \div 10^7$  $A_{10} = -1.6895013 \div 10^8$ |
| Surface S15: | $K = 0.00$ |
| | $A_4 = 1.2930351 \div 10^3$  $A_6 = -9.0992588 \div 10^5$ |
| | $A_8 = -1.8057049 \div 10^6$  $A_{10} = 6.1888602 \div 10^7$ |
| Surface S19: | $K = 6.7127548 \div 10^2$ |
| | $A_4 = 3.1355282 \div 10^4$  $A_6 = -1.7819239 \div 10^6$ |
| | $A_8 = 1.1725281 \div 10^7$  $A_{10} = -2.2281019 \div 10^9$ |
| | Wide-angle End |
| Surface S2 | $d = 0.39000$ |
| Surface S6 | $d = 7.7870$ |
| Surface S8 | $d = 1.9534$ |
| | Intermediate |
| Surface S2 | $d = 4.0851$ |
| Surface S6 | $d = 3.6548$ |
| Surface S8 | $d = 2.3904$ |
| | Telephoto End |
| Surface S2 | $d = 7.7802$ |
| Surface S6 | $d = 1.4006$ |
| Surface S8 | $d = 0.95000$ |

Figure 17:
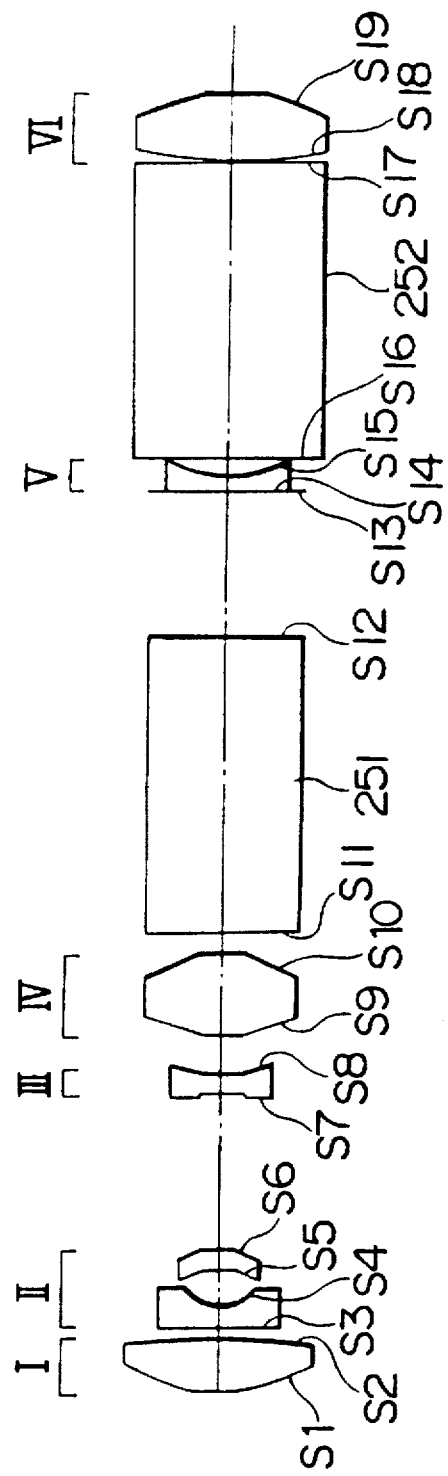
FIG. 17 is a view showing the arrangement of lens elements in the optical zoom finder in the embodiment.

The arrangement of lens elements in the above-described <<Example of Finder Numerical Values>> is shown in FIG. 17. FIG. 17 is a general view of the optical viewfinder of this embodiment which has six lens sets I to VI. In the drawing, the reference numerals 251 and 252 designate prisms which serve to invert an image vertically and horizontally. In the drawing, S13 represents a visual field frame surface which abuts on a surface S14 of the lens set V. An air gap is formed between a surface S15 of the lens set V and a surface S16 of the prism 252.

Figure 18:
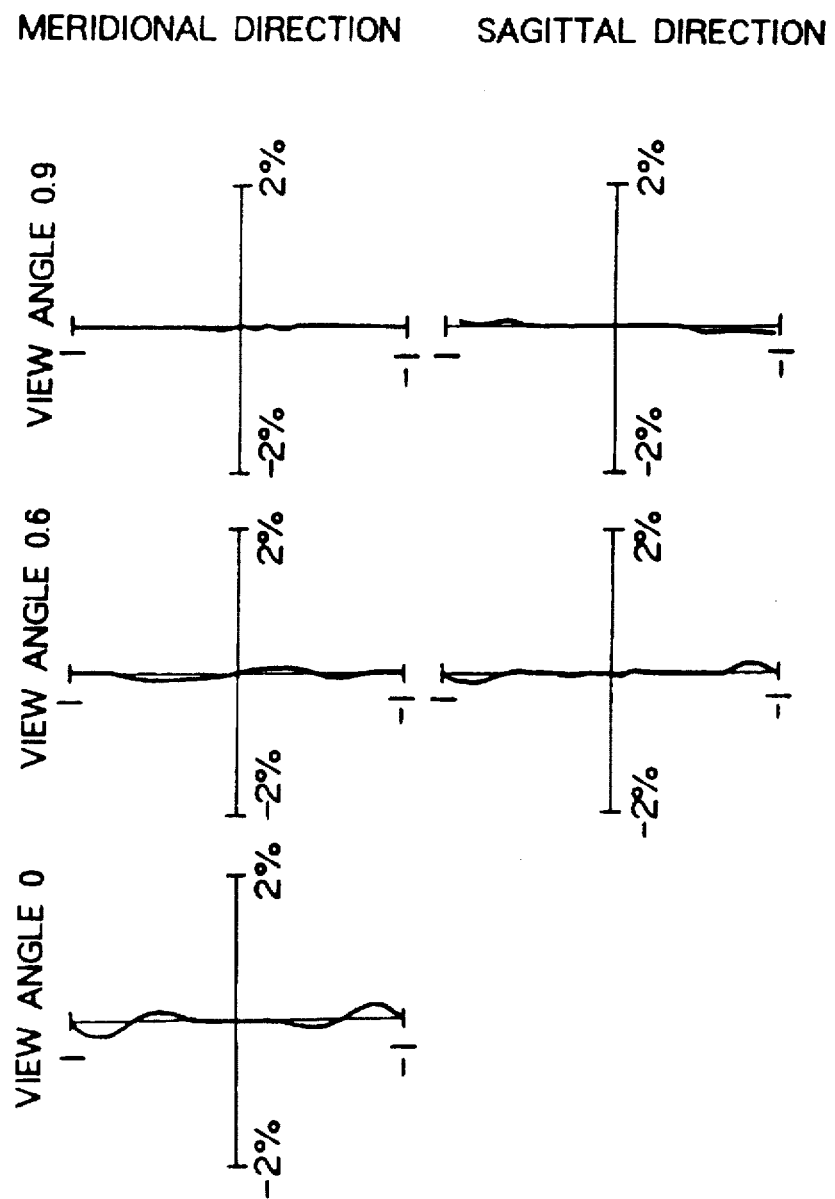
FIG. 18 is a graph view of wide-angle end aberration of the finder.
Figure 19:
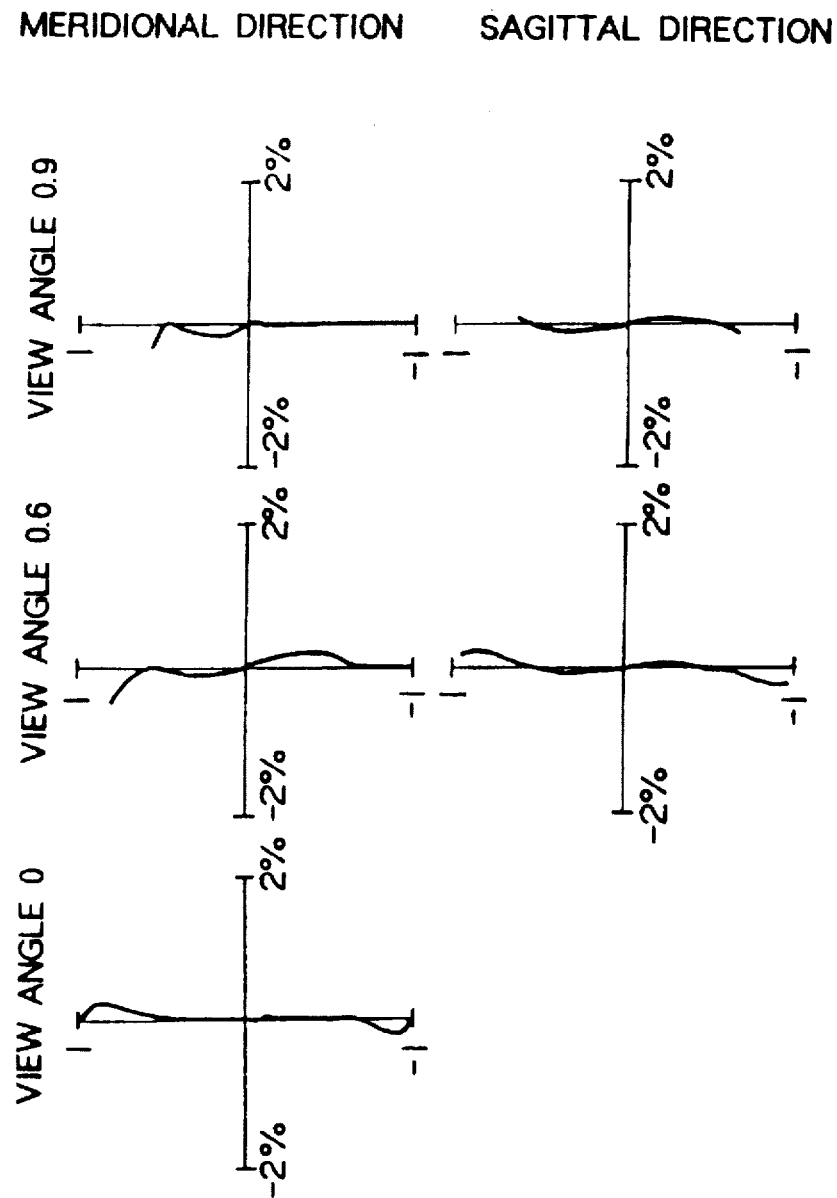
FIG. 19 is a graph view of intermediate aberration of the finder.
Figure 20:
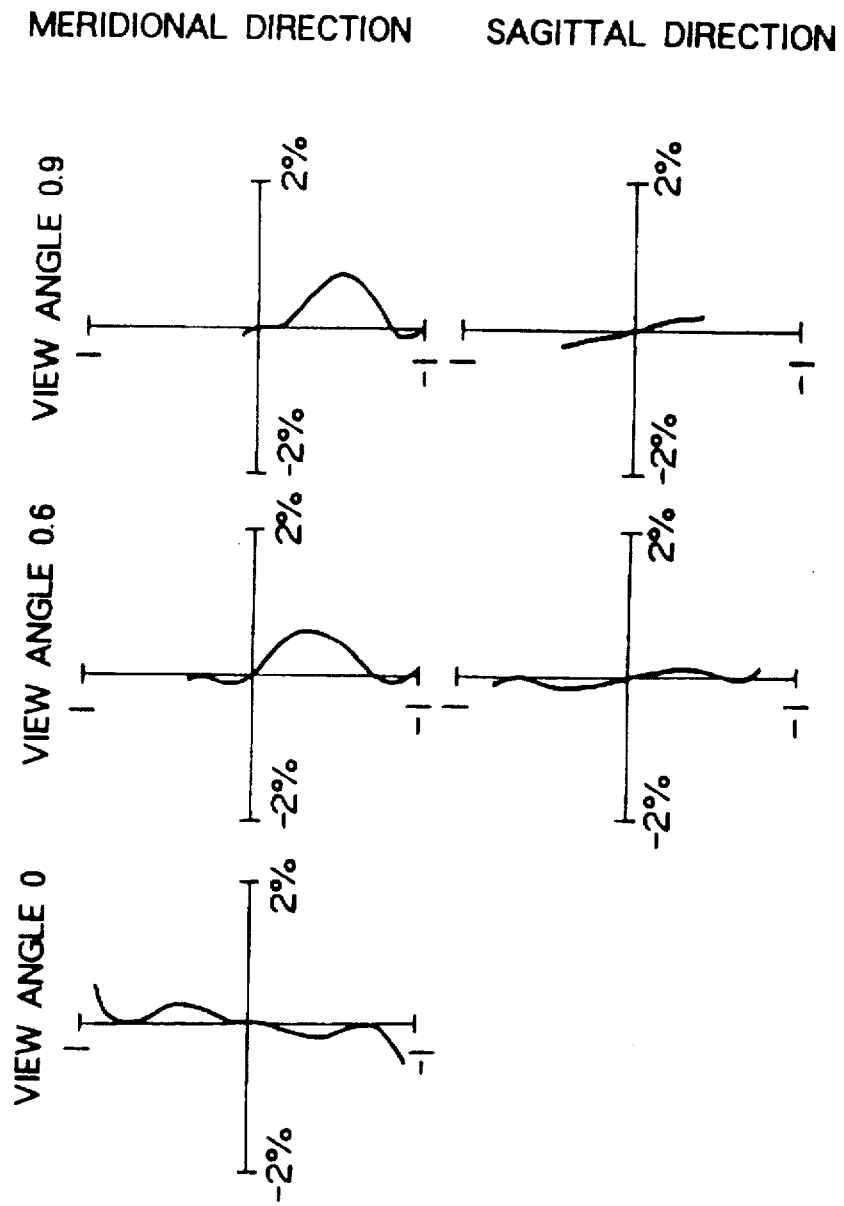
FIG. 20 is a graph view of telephoto end aberration of the finder.

In the above embodiment, good aberration as shown in FIGS. 18 to 20 can be obtained, and an optical zoom finder with the zooming ratio of 5.6, the maximum view angle of 53.5°, the paraxial magnification of 0.44 to 2.46 and the visual field angle of 25° can be obtained.

In FIG. 18, the view angle values 0.6 and 0.9 express 16.1° and 24.1°, respectively. In FIG. 19, the view angle values 0.6 and 0.9 express 8.71° and 13.3°, respectively. In FIG. 20, the view angle values 0.6 and 0.9 express 3.1° and 4.6°, respectively.

A modified example of the video camera lens will be described below. In this video camera lens, that is, in the zoom lens, the number of lens elements is reduced as extremely as possible.

Figure 21:
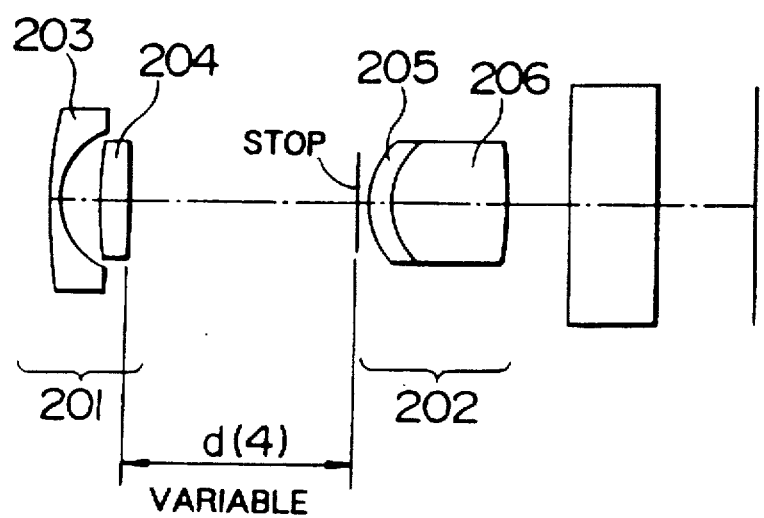
FIG. 21 is a view of the arrangement of lens elements in a video camera lens as another embodiment according to the present invention.

The modified example of the zoom lens is shown in FIG. 21.

In the drawing, the reference numeral 201 designates a first lens set having negative refractive power, 202 a second lens set having positive refractive power, 203 a negative meniscus lens element disposed in the first lens set 201 and having a convex surface facing to an object side, 204 a positive double-convex lens element disposed in the first lens set 201, 205 a negative meniscus lens element disposed in the second lens set 202 and having a convex surface facing to an object side, and 206 a positive double-convex lens element disposed in the second lens set 202. In order to change magnification from a wide-angle side to a telephoto side, the second lens set 202 is moved to the object side and, at the same time, the first lens set 201 is moved so as to suppress the movement of the image position at the time of the changing of magnification to thereby perform the magnification changing operation. The quantity of the movement of the first lens set 201 is calculated on the basis of focal lengths of the respective lens sets, etc., by a known method. A cam mechanism is designed so that the first lens set 201 can be moved in the above manner.

<<Example 1 of Numerical Values>> in the zoom lens shown in FIG. 21 is as follows. In the following table r(i) represents a radius of curvature of the i-th lens surface S(i) in the order from the object side, d(i) represents the distance on the optical axis between lens surfaces S(i) and S(i+1), N(j) represents the refractive power of the j-th lens element in the order from the object side, v(j) represents the Abbe number of the j-th lens element in the order from the object side, f represents the total focal length of the zoom lens system, FNO represents the maximum aperture ratio, and ω represents the angle of view.

| <<Example 1 of Numerical Values>> | | | | |
|---|---|---|---|---|
| FNO = 1:2.7–4.8 | | f = 5.22–15.01 | | |
| | | ω = 59.81°–22.61° | | |
| S | r | d | N | v |
| 1 | 21.10 | 0.50 | 1.69680 | 55.5 |
| 2 | 3.98 | 1.99 | | |
| 3 | 12.14 | 1.65 | 1.58390 | 30.3 |
| 4* | 24.56 | variable | | |
| 5 | (stop) | 0.50 | | |
| 6 | 4.99 | 1.00 | 1.84666 | 23.9 |
| 7 | 3.87 | 0.10 | | |
| 8* | 3.91 | 0.01 | 1.50703 | 53.4 |
| 9 | 3.91 | 6.00 | 1.49700 | 81.6 |
| 10 | -13.78 | 0.01 | 1.50703 | 53.4 |
| 11* | -13.78 | | | |

In order to express the relationship between the quantity of the movement of the first lens set 201 and the quantity of the movement of the second lens set 202, values for the total focal length f of the zoom lens system and variable one d(4) of the distances between lens surfaces are shown as follows.

| f | 5.22 | 7.74 | 15.01 |
|---|---|---|---|
| d(4) | 11.49 | 6.25 | 1.00 |

Lens surfaces designated by the surface numbers S to each of which the reference symbol * is appended are aspherical surfaces. The shapes of the aspherical surfaces are expressed by aspheric coefficients as represented by the following equation:

$$Z = CH^2/(1+1-(K+1)C^2Y^2) + A_4Y^4 + A_6Y^6 + A_8Y^8 + A_{10}Y^{10}\ldots \text{(Equation 1)}$$

in which Z represents the distance between a point on an aspherical surface at height Y from the optical axis and a plane tangent to an apex of the aspherical surface, C represents the curvature (1/r) of a reference spherical surface, K represents a constant of the cone, Y represents the height from the optical axis, and $A_4$ to $A_{10}$ represent aspheric coefficients of the fourth degree to the tenth degree respectively.

Aspheric coefficients in the above embodiment are as follows.

| Surface S4: | $K = -135.32$ | |
| --- | --- | --- |
| | $A_4 = 1.9010 + 10^4$ | $A_6 = -1.9053 + 10^4$ |
| | $A_8 = 2.0343 + 10^5$ | $A_{10} = -1.3744 + 10^6$ |
| Surface S8: | $K = -0.68289$ | |
| | $A_4 = 5.9938 + 10^4$ | $A_6 = 1.5091 + 10^4$ |
| | $A_8 = -1.8459 + 10^5$ | $A_{10} = 1.7038 + 10^6$ |
| Surface S11: | $K = -1.2974$ | |
| | $A_4 = 6.2774 + 10^4$ | $A_6 = 2.7567 + 10^4$ |
| | $A_8 = -5.7906 + 10^5$ | $A_{10} = 5.3171 + 10^6$ |

Figure 22:
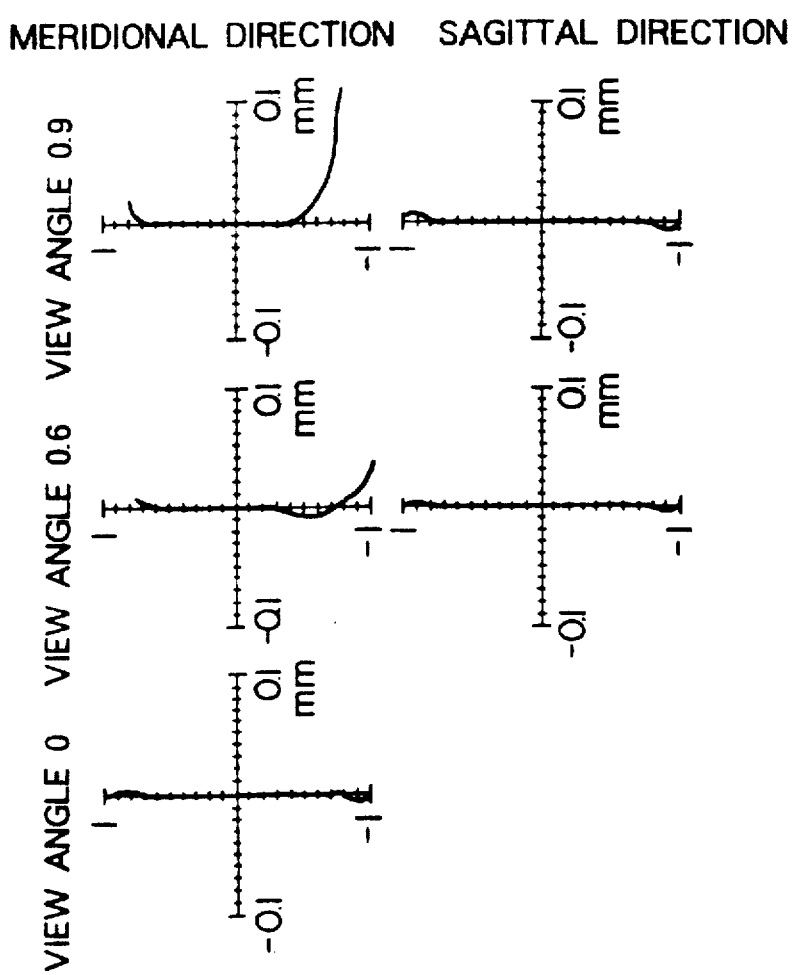
FIG. 22 is a graph view of wide-angle end aberration of the video camera lens.
Figure 23:
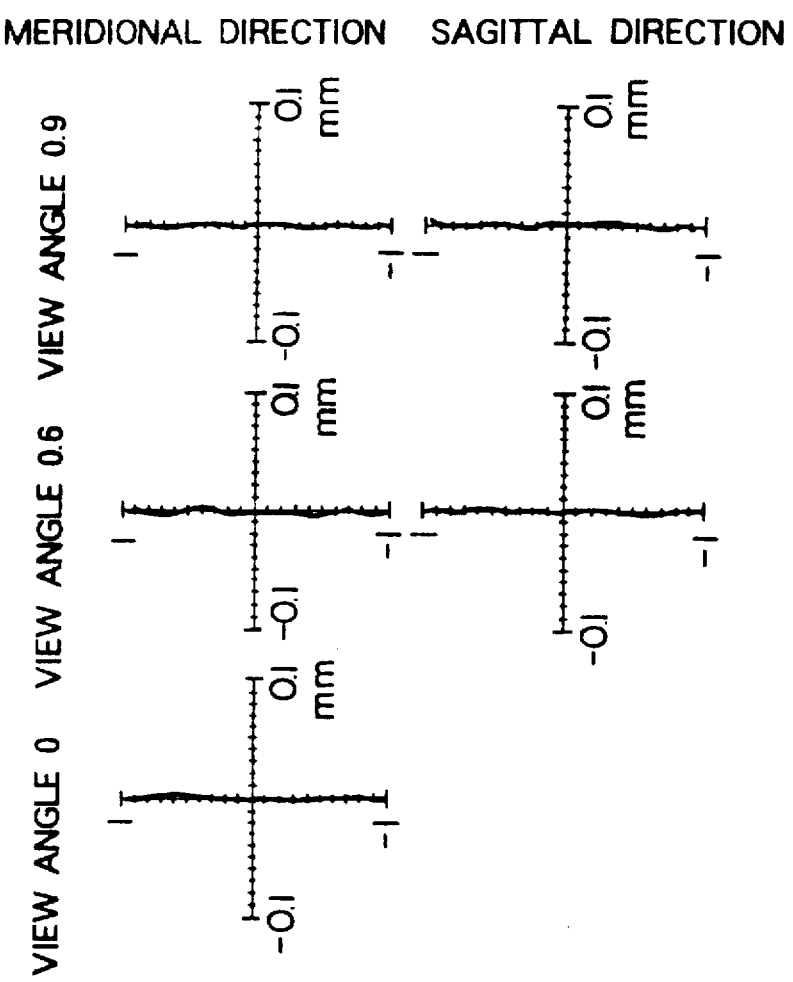
FIG. 23 is a graph view of telephoto end aberration of the video camera lens.

FIGS. 22 and 23 are characteristic graphs showing aberration in the above <<Example 1 of Numerical Values>>. In FIG. 22, the view angle values 0.9 and 0.6 express about 25° and about 17°, respectively. In FIG. 23, the view angle values 0.9 and 0.6 express about 9° and about 6°, respectively.

Figure 24:
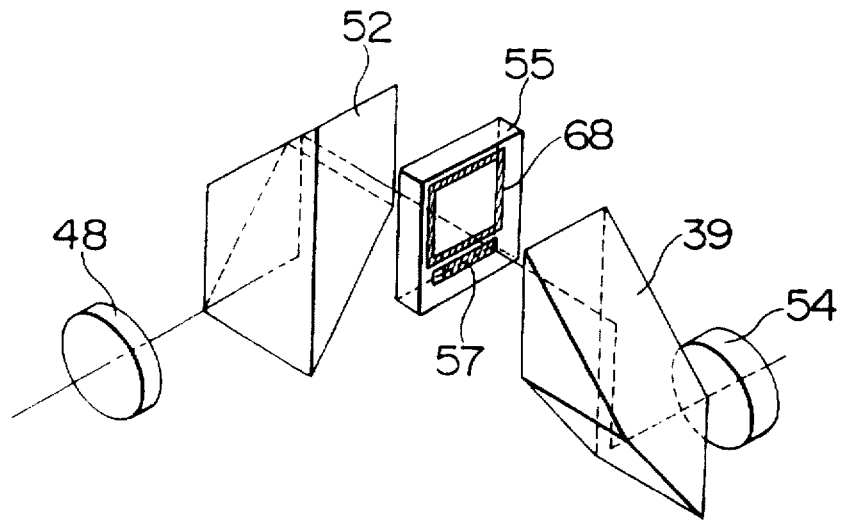
FIG. 24 is a perspective view of the arrangement of parts in a finder as a further embodiment according to the present invention.
Figure 25:
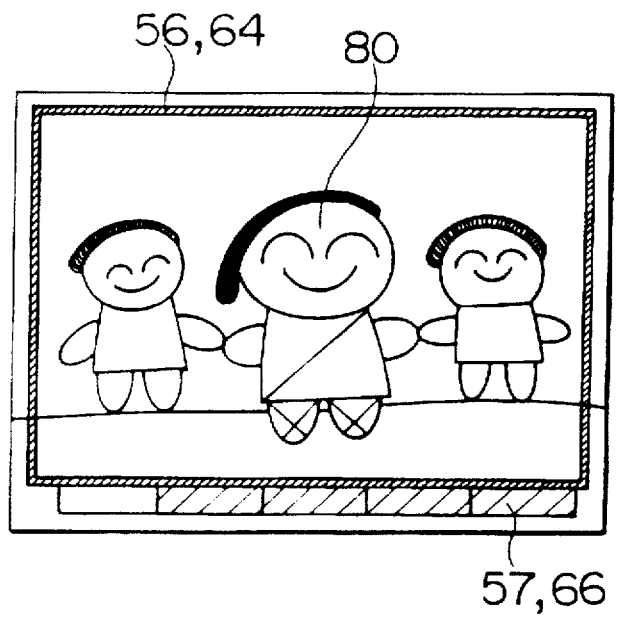
FIGS. 25 and 26 are views for explaining the operation of the finder.
Figure 26:
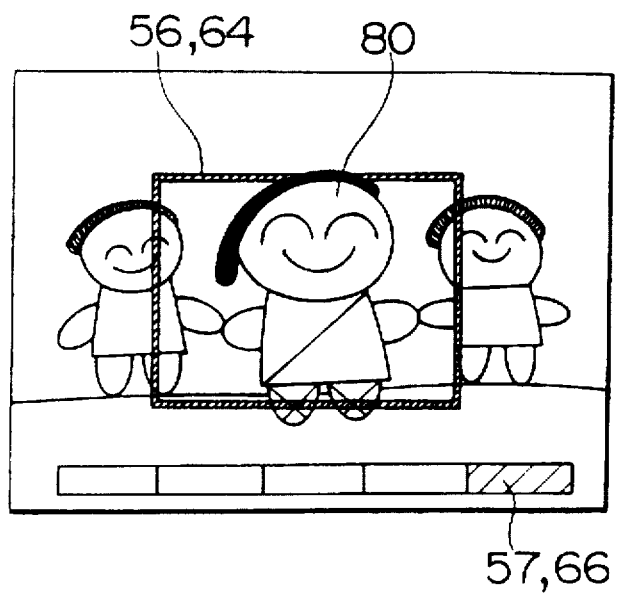

Another embodiment of the optical viewfinder will be described below with reference to FIG. 24. This viewfinder uses no zoom lens from the viewpoint of reduction in number of parts. This optical viewfinder is a real-image type finder. An optical system of the optical viewfinder is composed of an objective lens 48, a pair of erecting prisms 52 and 53, a transmission type liquid crystal display element 55, and an ocular lens 54. Each of the objective lens 48 and the ocular lens 54 is constituted by a convex lens. The erecting prisms 52 and 53 disposed between the objective lens 48 and the ocular lens 54 reflect an inverted image produced by the objective lens 48, at four, upper, lower, left and right positions totally by four times to thereby obtain an erect image. The transmission type liquid crystal display element 55 is disposed in the position of focus of the objective lens 48, so that data displayed on the transmission type display element 55 and an image formed by the objective lens 48 can be observed simultaneously through the ocular lens 54. The transmission type liquid crystal display element 55 generates a visual field frame 56 and a count-down display 57 by using a light shutter function. That is, the visual field frame 56 is so black as to be impervious to light, and the other than the visual field frame 56 is pervious to light. The count-down display 57 is separated into five blocks. At the point of time of the starting of image recording, all the five blocks are so black as to be impervious to light. The light-impervious blocks disappear successively with the passage of time, so that all the blocks disappear when the image recording time is finished. On the contrary, the five blocks may be designed so that one black block appears at the point of time of the starting of image recording and that and all the five blocks appear with the passage of time to thereby indicate the fact that the image recording is finished. In this embodiment, the objective lens 48 is not constituted by a telephoto lens. The change of the telephoto magnification ratio of the video camera lens 11 is expressed by the change of the size of the visual field frame 56. That is, when the telephoto magnification ratio is 1, the size of the visual field frame 56 is on the outer side of the visual field as shown in FIG. 25. As the telephoto magnifying power increases, the size of the visual field frame 56 decreases as shown in FIG. 26. Accordingly, the visual field frame 56 is narrowed on the center of the visual field to thereby display a range in which an image is picked up by the image pickup element 25. In this embodiment, the optical viewfinder is disposed in parallel to the video camera lens 11. Accordingly, parallax, that is, difference between the display range of the video camera lens 11 and the photographing range of the optical viewfinder is produced. In order to solve this problem, the visual field frame 56 moves within the transmission type liquid crystal display element 55 to thereby correct the parallax.

Figure 27:
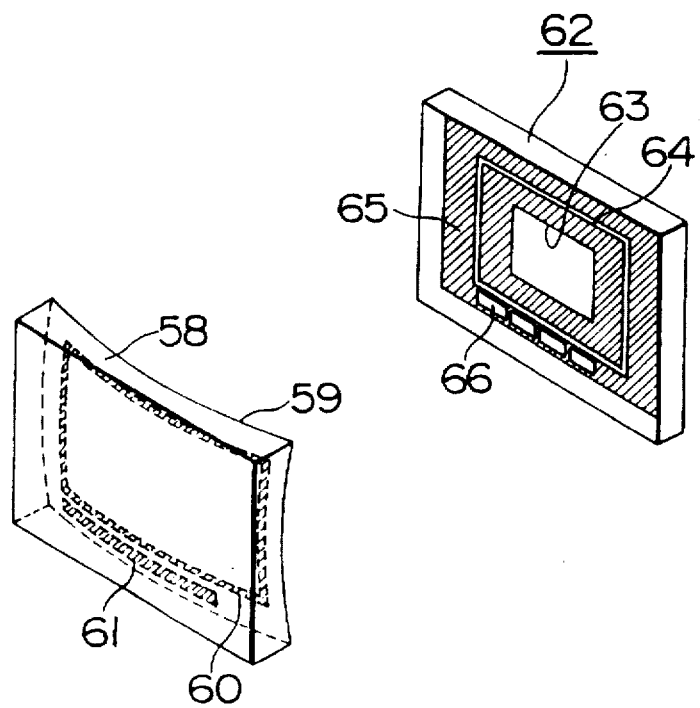
FIG. 27 is a perspective view of the arrangement of parts in a further embodiment according to the present invention in which an Albada finder is used.

FIG. 27 shows the structure of the optical viewfinder as another embodiment of the present invention. In this embodiment, the optical viewfinder is composed of an objective lens 58, and a reflection type liquid crystal display element 62. The object lens 58 is constituted by a concave lens having a semi-transparent mirror 59 formed by application of a metallic film to the rear surface of the convex lens by means of evaporating deposition. The reflection type liquid crystal display element 62 has a reflecting mirror 65 provided with a window 63 formed at the center of the reflecting mirror 65. A visual field frame 64 is formed by using the light shutter function of the reflection type liquid crystal display element 62. That is, only the visual field frame 64 is pervious to light but the inside and outside of the visual field frame 64 are impervious to light. Data displayed on the reflection type liquid crystal element 62 are reflected by the objective lens 58 and the semi-transparent mirror 59 so that the data can be observed through the window 63. That is, because the visual field frame 64 portion is pervious to light, light incident on the visual field frame 64 from the objective lens 58 is reflected by the reflecting mirror 65 so that a visual field frame image 60 is formed on the semi-transparent mirror 59. Because the other portions than the visual field frame 64 are however impervious to light, they are observed as black portions so that there is no image on the semi-transparent mirror 59. Further, because the cameraman's eye comes to the window 63, they become black or near color at the time of shooting so that nothing can be displayed on the semi-transparent mirror 59. Accordingly, only the visual field frame image 60 is displayed on the semi-transparent mirror 59 so as to be superposed on the subject image passing through the objective lens 58. Because the semi-transparent mirror 59 is a concave mirror and the visual field frame 64 is located within the focal length of the concave mirror, the visual field frame image 60 being reflected in the semi-transparent mirror 59 serving as a concave mirror is a virtual image. Because the visual field frame image 60 as a virtual image and the subject image formed at a great distance can be observed at one position, the visual field frame 60 can be observed so clearly that an exact photographing range can be found. Because the size of the visual field frame 64 can be changed freely as described, for example, in Kubota et al., "Optics Technical Handbook", ASAKURA SHOTEN, 1970, pages 863–866. the size of the visual field frame image 60 can be set freely. Further, a count-down display 66 provided in the lower of the visual field frame 64 is reflected as a count-down display image 61 in the semi-transparent mirror 59 in the same manner as described above. In this embodiment, the objective lens 48 is not constituted by a telephoto lens. In this embodiment, also the size of the visual field frame 64 changes in accordance with the telephoto magnification ratio of the video camera lens 11 in the same manner as in the size of the visual field frame 56 described previously in the embodiment of FIG. 24.

In the above description, the objective lens 48 may be replaced by a zoom lens. Because a pair of erecting prisms 52 and 53 are used in this embodiment, the length of the light passage in the direction of the optical axis can be elongated by the quantity based on the four reflections and, accordingly, the length of the zoom lens can be reduced.

A system used at the time of image reproducing with use of the video camera system of the embodiment will be described below as a further embodiment of the present invention with reference to FIG. 28.

Figure 28:
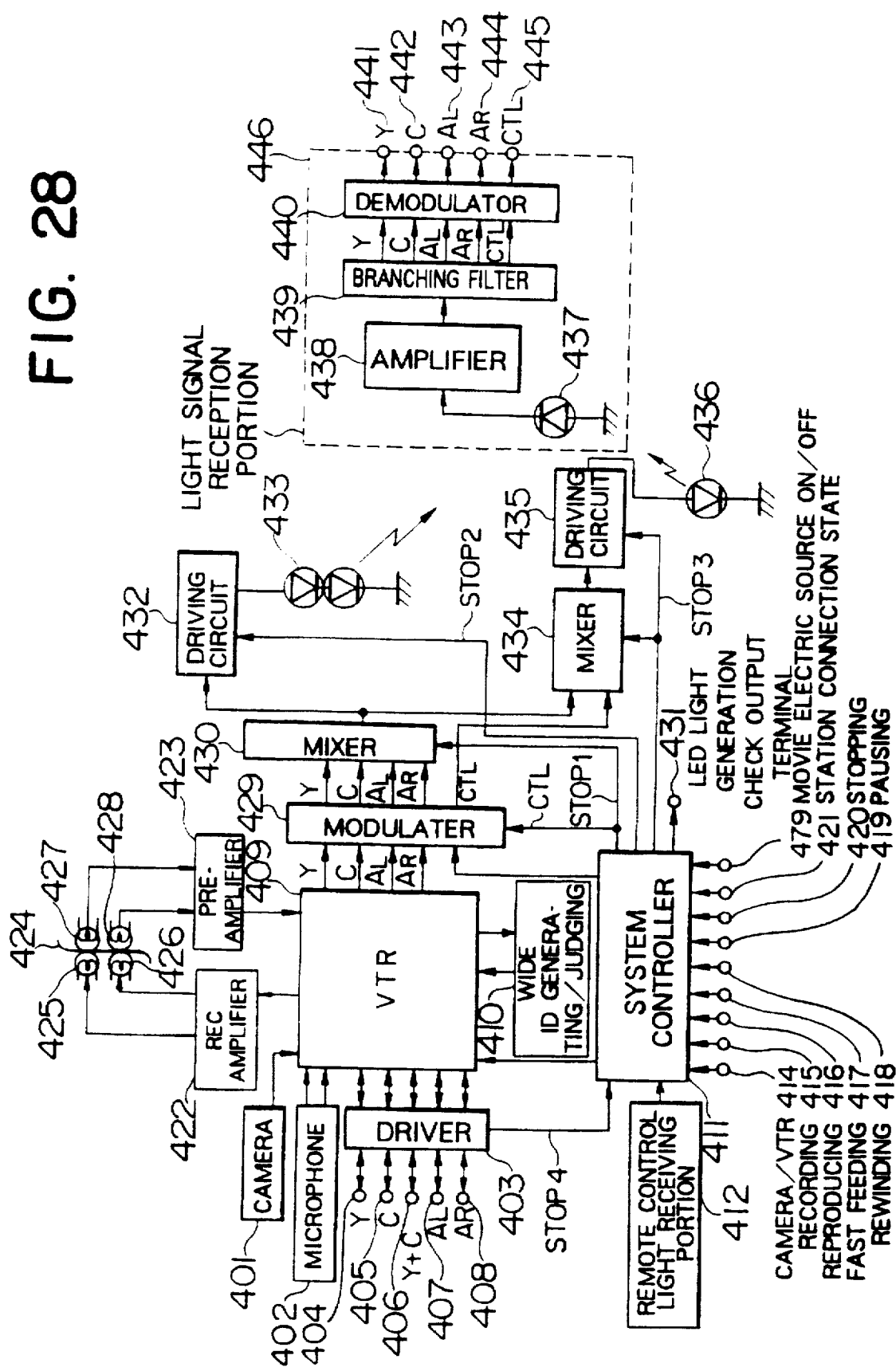
FIG. 28 is a block diagram showing the configuration of the video camera and the station in the embodiment.

This system shown in FIG. 28 is adapted to two transmission methods, namely, short distance transmission method by which an infrared signal is transmitted in the condition where a camera-built-in type VTR (compact video camera) is put on a camera-built-in type VTR interface apparatus (station), and spatial transmission method by which an infrared signal is transmitted in the condition where the compact video camera is far from the station.

In the drawing, the reference numeral 401 designates a video camera, 402 a microphone, 403 a driver, 404 to 408 I/O terminals respectively, 409 a VTR, is 410 a wide ID signal generating/judging circuit, 411 a system controller, 412 a remote-control light receiving portion, 414 to 421 input terminals respectively, 422 a REC amplifier, 423 a pre-amplifier, 424 a magnetic tape, 425 and 426 magnetic recording heads respectively, 427 and 428 magnetic reproducing heads respectively, 429 a modulator, 430 a mixer, 431 a light signal generation check output terminal, 432 a driving circuit, 433 an infrared light-emitting diode (LED), 434 a mixer, 435 a driving circuit, 436 an infrared light-emitting diode (LED), 437 a photodiode, 438 an amplifier, 439 a branching filter, 440 a demodulator, 441 to 445 output terminals respectively, 446 a light signal receiving portion and 447 a movie electric source switching on/off input terminal. Assume now that the light signal receiving portion 446 is incorporated in the station which receives an infrared signal. Assume further that "H" is given to the input terminals in the respective cases of recording, reproducing, fast feeding, rewinding, pausing and stopping but "L" is given thereto in the other cases. Further, the signal to be inputted at the input terminals 415 to 420 into the system controller 411 may be inputted by using an external remote control device. In this case, the infrared signal from the remote control device is converted into an electric signal at the remote-control light receiving portion 412 so that the electric signal is supplied to the system controller 411.

Figure 29:
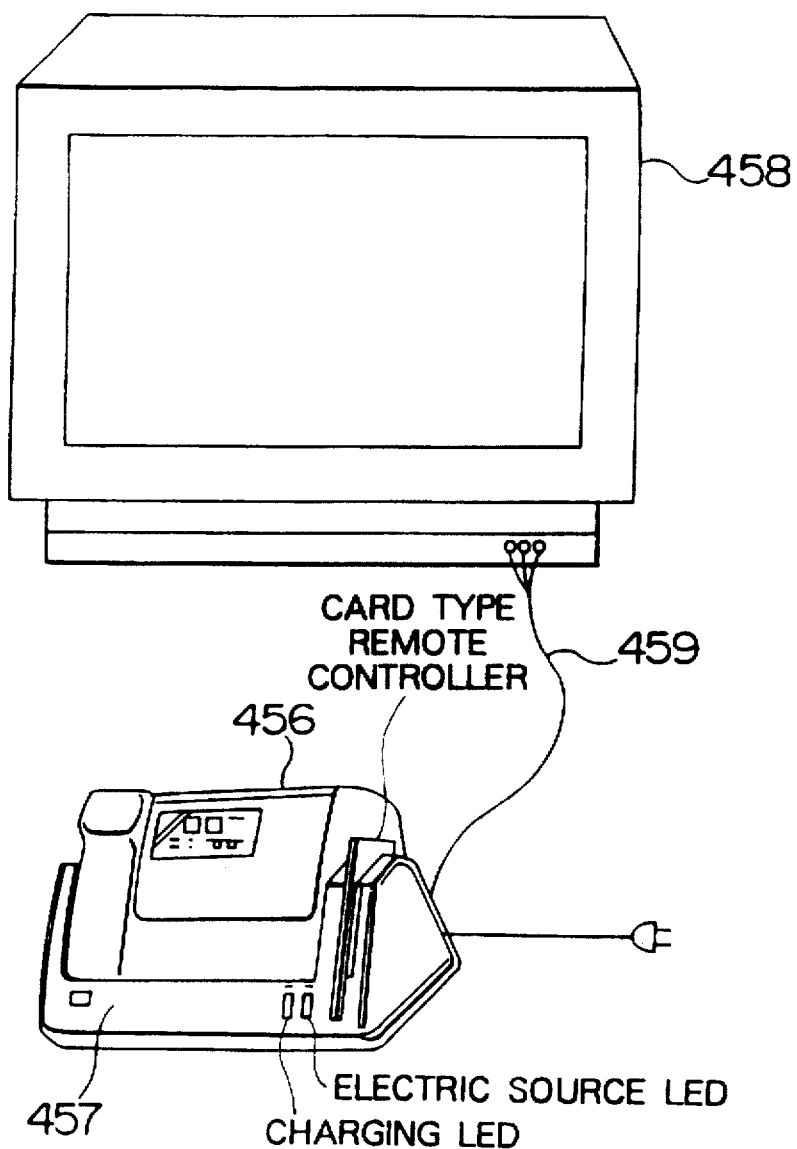
FIGS. 29 and 30 are views showing the condition where the video camera and the station are used actually.

First, the methods for transmitting a signal between a compact video camera and a station will be described below with reference to FIGS. 29 and 30. FIG. 29 shows the short distance transmission method by which a signal is transmitted in the condition where a compact video camera is put on a station. In the drawing, the reference numeral 456 designates a compact video camera, 457 a station, 458 a TV set, and 459 a set of connection cords. Assume now that the TV set 458 and the station 457 are preliminarily connected to each other through the respective connection cords 459 for video, audio and control signals.

In order to reproduce on the TV set 458 a video tape photographed by the compact video camera 456, connection is completed easily when the compact video camera 456 is put on the station 457. In this case, video and audio signals can be transmitted to the station 457 by a simple operation of transmitting an infrared signal with respect to a short distance of the order of cm between the compact video camera and the station. Assume now that the compact video camera 456 and the station 457 have an infrared signal transmitting portion at the lower surface of the compact video camera and an infrared signal receiving portion at the upper surface of the station respectively and that the infrared signal transmitting and receiving portions are provided so as to face to each other. Assume further that an electric source is supplied to the compact video camera 456 directly from a DC output of the station 457.

Figure 30:
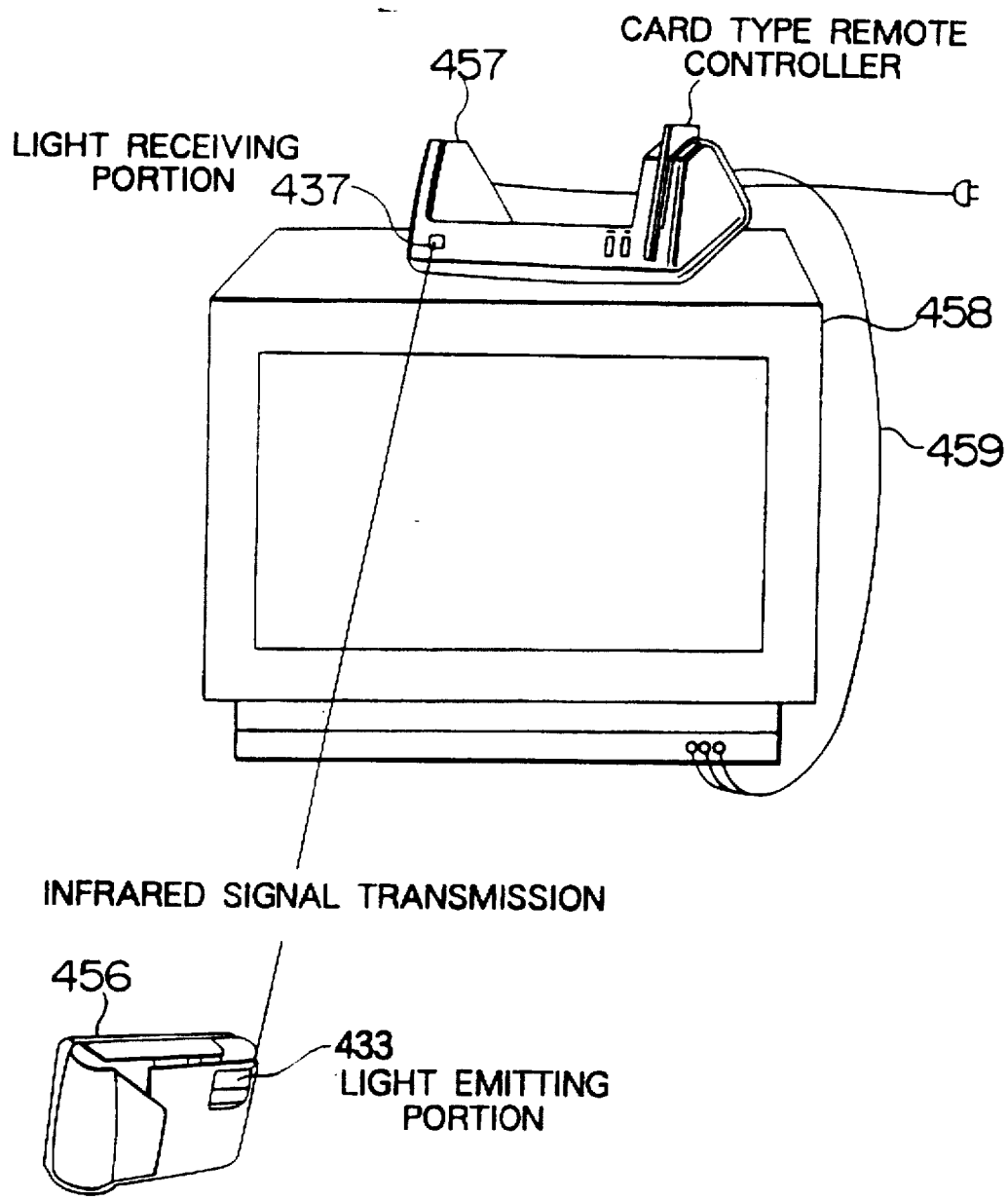

On the other hand, FIG. 30 shows the spatial transmission method by which a signal is transmitted in the condition where the compact video camera is not put on the station but placed several meters far from the station. Also in this case, the TV set 458 and the station 457 are preliminarily connected to each other through the respective connection cords 459 for video, audio and control signals. In this case, in order to reproduce on the TV set 458 a video tape photographed by the compact video camera 456, video and audio signals can be transmitted to the station 457 by an operation of transmitting an infrared signal with respect to the considerable distance from the compact video camera 456 to the station 457. Assume now that the infrared signal transmitting portion of the compact video camera 456 and the infrared signal receiving portion of the station 457 are located at the upper or side surface of the compact video camera 456 respectively. The infrared signal transmitting portion of the compact video camera may be provided as a pop-up type and mounted to the upper surface of the compact video camera so that the infrared signal transmitting portion can be used after popped up as occasion demands. If, in this case, a function of popping up the infrared signal transmitting portion automatically is provided, handling performance can be improved more greatly. In this case, an infrared signal issuing portion and an infrared signal receiving portion which make a pair are prepared. Further, in the case of spatial transmission, the compact video camera 456 may be driven by a battery mounted onto the compact video camera.

In FIG. 28, assume that the respective operations of the modulator 429 and the mixer 430 are stopped when a signal STOP1 supplied to the modulator 429 and the mixer 430 is "L". Assume further that the operation of the driving circuit 432 is stopped when a signal STOP2 is "L" and that the respective operations of the mixer 434 and the driving circuit 435 are stopped when a signal STOP3 is "L". Assume further that an output signal STOP4 of the driver 403 becomes "L" when cords are connected to the I/O terminals 404 to 408 and that the signal STOP4 becomes "H" when cords are not connected to the I/O terminals. Assume further that "H" is outputted from the LED generation check signal output terminal 431 when the LED emits light and that "L" is outputted from the terminal 431 when the light emitting operation of the LED is stopped. Accordingly, in this embodiment, the fact that light is emitted can be indicated so as to be notified to the user at the time of emitting of light from the LED. Assume further that "H" is inputted into the input terminal 474 when the electric source switch of the compact video camera is on and that "L" is inputted into the terminal 474 when the electric source switch is off.

First, the case where the output signal of the camera/VTR changeover switch to be inputted into the input terminal 414 turns to "L" to thereby select the camera mode will be described below.

After a video signal photographed by the camera 401 is processed in the camera 401, a luminance signal (Y) and a chromatic signal (C) are supplied to the VTR 409. Similarly, L-channel (AL) and R-channel (AR) audio signals inputted into the microphone 402 are supplied to the VTR 409. In the VTR 409, the luminance signal (Y) is FM-modulated, the chromatic signal (C) is frequency-converted from 3.58 MHz into a lower frequency band, and then the signals are mixed to obtain a video signal. On the other hand, the audio signals inputted into the microphone 402 are FM-modulated in the VTR 409. These video signal and FM audio signals are added to each other in the VTR 409.

Assuming now that a recording start signal is inputted into the input terminal 415, then the video and FM audio signal thus obtained by the addition in the VTR 409 is supplied to the REC amplifier 422, amplified by the REC amplifier 422 and recorded on the magnetic tape 424 by means of the magnetic heads 425 and 426.

The case where the signal given to the input terminal 414 turns to "H" to thereby select the VTR mode will be described below.

Assuming now that a reproducing start signal is inputted into the input terminal 416, then the video signal and the FM audio signal are reproduced from the magnetic tape 424 by means of the magnetic heads 427 and 428. Thereafter, these signals are amplified by the pre-amplifier 423 and then supplied to the VTR 409. The video signal inputted into the VTR 409 is converted into a luminance signal (Y) and a chromatic signal (C) by a luminance signal processing circuit and a chromatic signal processing circuit in the VTR 409. The FM audio signal inputted into the VTR 409 is processed by the BPF in the VTR 409 so that stereo FM audio signals are extracted therefrom. Then, the signals are converted into L-channel (AL) and R-channel (AR) audio signals by an FM audio signal demodulation circuit.

The transmission of an infrared signal between the compact video camera and the station will be described below. Assume now that there is no cord connected to the I/O terminals 404 to 408 and that the output signal STOP4 of the driver 403 is "I".

First, the short distance transmission in which a signal is transmitted in the condition where the compact video camera is put on the station will be described. Assume now that when the compact video camera is put on the station, an electric source from the DC output of the station is automatically supplied to the compact video camera and, at the same time, "H" is given to the station connection state input terminal 421.

In this case, the output signals STOP1 and STOP3 of the system controller 411 are always "H" whereas the output signal STOP2 is always "L". Accordingly, the modulator 429, the mixers 430 and 434 and the driving circuit 435 are always in operation whereas the driving circuit 432 is always out of operation.

The luminance signal (Y), the chromatic signal (C) and the L-channel (AL) and R-channel (AR) audio signals outputted from the VTR 409 are modulated by the modulator 429 and then delivered to the mixer 430. Similarly, the control signal (CTL) supplied by the system controller 411 is modulated by the modulator 429 and then delivered to the mixer 434. In the mixer 430, the modulated luminance signal (Y), chromatic signal (C) and audio signals (AL, AR) are mixed. Then, in the mixer 434, the modulated control signal (CTL) is added to the mixture signal, so that the resulting mixture signal is delivered to the driving circuit 435. The signal thus obtained by addition is converted into an infrared signal by the LED 436 so that the infrared signal is continuously transmitted to the station. On the other hand, the output signal of the mixer 430 is not emitted from the LED 433 because the driving circuit 432 is always out of operation.

As described above, in the case of short distance transmission in which a signal is transmitted in the condition where the compact video camera is put on the station, video, audio and control signals are continuously transmitted from the compact video camera to the station. This is because the DC electric source from the station can be supplied to the compact video camera so that there is no necessity of considering battery exchange.

The infrared signal emitted from the LED 436 is received by the photodiode 437 of the station and converted into an electric signal. This electric signal is amplified by the amplifier 438 and separated into modulated luminance (Y), chromatic (C), audio (AL, AR) and control (CTL) signals by the branching filter 439. The demodulator 440 demodulates the respective modulated signals and outputs the demodulated signals at the output terminals 441 to 445 respectively. Because these signals are transmitted through connection cords from the station to the TV set and the VTR, reproduction and edition of the video tape photographed by the compact video camera can be made possible when the compact video camera is put on the station.

Here, the control signal (CTL) is also supplied to the TV set. Accordingly, the same function as that of an AV bus cable can be given to the light transmission system when electric source control signals and input mode switching signals for the TV set and the VTR which must be conventionally transmitted through such an AV bus cable are provided so as to be included in the control signal (CTL). In this case, there is no maloperation of other apparatuses, because the infrared signal is transmitted to no apparatus but the station.

The control signal for TV/VTR varies in accordance with the TV/VTR makers. Therefore, in order to add a control signal corresponding to each maker's TV/VTR to the infrared signal, in this embodiment, a function of learning each maker's remote control signal is provided to the compact video camera. An infrared signal from each maker's remote control device is received by the remote control light receiving portion 412 and memorized in the system controller 411 to thereby perform this function.

The case of spatial transmission in which a signal is transmitted in the condition where the compact video camera is not put on the station but placed several meters far from the station will be described below. In this case, assume that the compact video camera is driven by a battery attached to the compact video camera. Assume further that "L" is inputted into the station connection state input terminal 421.

In this case, the output signal STOP3 of the system controller 411 are always "L". Accordingly, the mixers 434 and the driving circuit 435 are always out of operation, so that there is no infrared signal emitted from the LED 436. When the input signal to the input terminal 414 is "L", that is, when the camera mode is selected, the output signals STOP1 and STOP2 are always "L" so that the modulator 429, the mixer 430 and the driving circuit 432 are always out of operation.

On the other hand, when the input signal to the input terminal 414 is "H", that is, when the VTR mode is selected, the signals STOP1 and STOP2 outputted from the system controller 411 are automatically turned to "H" in response to the start of reproducing operation of the compact video camera on the basis of the reproducing start signal given to the input terminal 416. As a result, the respective operations of the modulator 429, the mixer 430 and the driving circuit 432 are started so that the luminance signal (Y), the chromatic signal (C) and the L-channel (AL) and R-channel (AR) audio signals outputted from the VTR 409 are modulated by the modulator 429 and then delivered to the mixer 430. Thereafter, the luminance signal (Y), the chromatic signal (C) and the audio signals (AL, AR) are mixed by the mixer 430 and then delivered to the driving circuit 432. The mixture signal is further converted into an infrared signal by the LED 433 and then transmitted to the station.

The infrared signal emitted from the LED 433 is received by the photodiode 437 of the station and converted into an electric signal. This electric signal is amplified by the amplifier 438 and separated into modulated luminance (Y), chromatic (C) and audio (AL, AR) signals by the branching filter 439. The demodulator 440 demodulates the respective modulated signals and outputs the demodulated signals at the output terminals 441 to 445 respectively. Because these signals are transmitted through connection cords from the station to the TV set and the VTR, reproduction and edition of the video tape photographed by the compact video camera can be made possible.

The case (fast-feeding reproduction or rewinding reproduction) where a fast-feeding or rewinding signal is supplied to the input terminal 417 or 418 at the time of reproducing will be described below. In this case, the output signals STOP1 and STOP2 of the system controller 411 are still "H", so that emission of infrared light is continued. On the other hand, also in the case (temporary stop of reproduction) where a pausing signal is inputted into the input terminal 419, the signals STOP1 and STOP2 are still "H", so that the infrared signal can be transmitted. However, in the case where a reproducing stop signal is inputted into the input terminal 420, reproduction from the magnetic tape is stopped and the signals STOP1 and STOP2 are automatically turned to "L". As a result, the respective operations of the modulator 429, the mixer 430 and the driving circuit 432 are stopped and, at the same time, the transmission of the infrared signal from the LED 433 is stopped.

On the other hand, in the case where a fast-feeding or rewinding signal is inputted into the input terminal 417 or 418 so that fast feeding or rewinding of the tape is carried out at the time of the stopping of reproduction, the signals STOP1 and STOP2 are still "L" so that there is no infrared signal transmitted.

As described above, the condition for transmission of the infrared signal from the LED 433 is limited to the case where the input signal to the input terminal 414 is selected to the VTR mode and, at the same time video and audio signals are being reproduced from the magnetic tape. By this limitation, it is made possible that the light transmission portion is automatically operated in the compact video camera side only in the case where the transmission of the light signal to the TV/VTR is required at the time of reproduction from the magnetic tape, and that the operation of the light transmission portion can be stopped in the other cases. As a result, consumption of the battery can be suppressed while the transmission of the infrared signal is not required. Further, in this case, the control signal (CTL) from the system controller 411 is not added to the infrared signal. Accordingly, the AV bus cable function for performing TV/VTR electric source control and input mode switching automatically at the time of video reproducing cannot be provided.

The light-receiving photodiode 437 can be constituted by one photodiode element if a light guide is used. In this case, it is preferable from the point of view of signal congestion of the photodiode or the like that the light waveguide is provided to the short distance transmission system.

The case where a connection cable from a TV/VTR is connected to the input terminals 404 to 408 will be described below. Because, in this case, the signal STOP4 supplied from the driver 403 to the system controller 411 is "L", the signals STOP1, STOP2 and STOP3 outputted from the system controller 411 are always "L" so that there is no infrared signal transmitted. Accordingly, the luminance signal (Y), the chromatic signal (C) and the L-channel (AL) and R-channel (AR) audio signals outputted from the VTR 409 are supplied to the driver 403 and outputted from the I/O terminal 404 to 408 to the TV/VTR through the connection cable. On the other hand, in the case of signal transmission from the TV/VTR to the compact video camera, the luminance signal (Y), the chromatic signal (C) and the audio signals (AL, AR) from the TV/VTR are supplied to the I/O terminals 404 to 408 through the connection cable and delivered to the VTR 409.

The wide ID signal generating/judging circuit 410 in this embodiment will be described below. One scene having the aspect ratio of 3:4 is used in TV broadcasting in the present but a wider scene having the aspect ratio of 9:16 will be used in high-vision broadcasting which will be popularized in the future. Therefore, the output signal of the VTR 409 is supplied to the wide ID signal generating/judging circuit 410 so that a result of wide scene judgment is delivered to the VTR 409 and the system controller 411. In the case where the video signal to be transmitted as a light signal is of a wide scene type, the screen size of the reception side TV can be automatically switched to the wide scene type by transmission of a signal for switching the screen size to the wide scene type.

Figure 31:
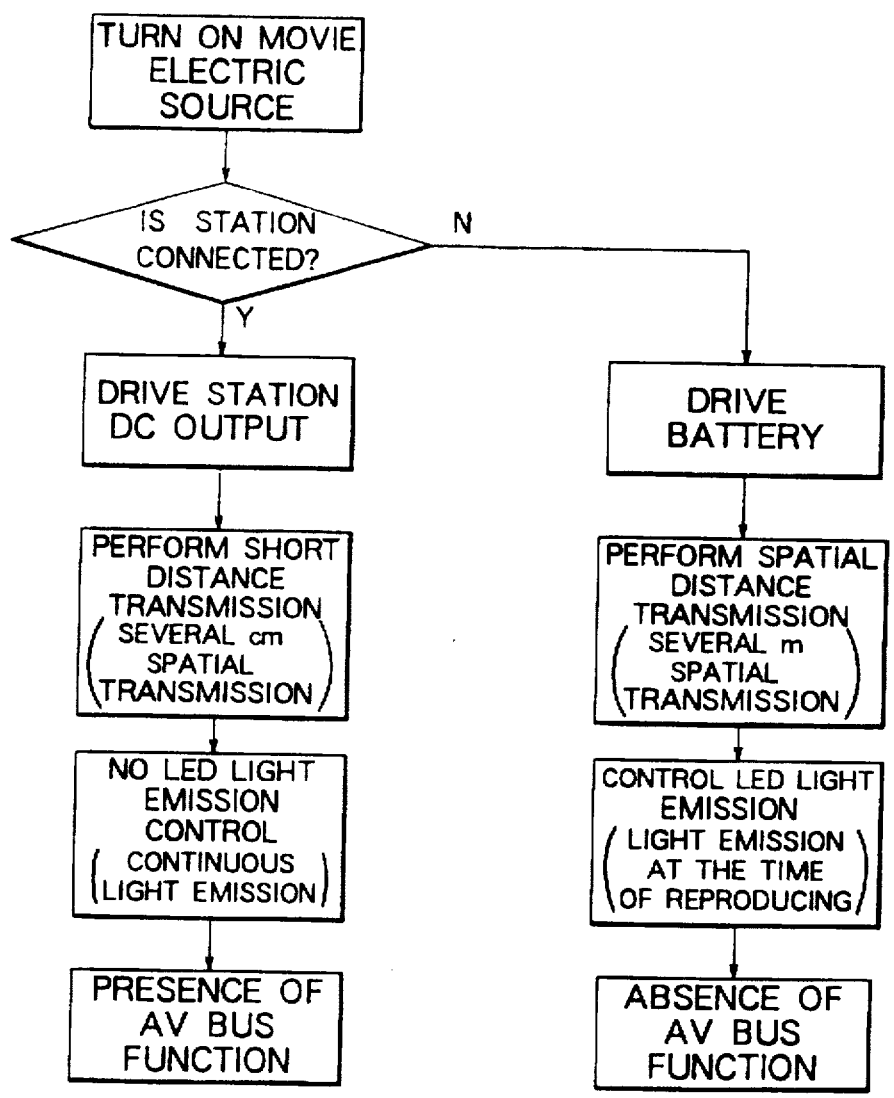
FIG. 31, 32 and 33 are flow charts showing the operations of the video camera and the station.

FIG. 31 is a flow chart concerned with means for driving the magnetic recording/reproducing apparatus including the light transmission function depicted in FIG. 28, means for transmitting the infrared signal, presence or absence of LED light emission control, and presence or absence of the AV bus cable function for controlling TV/VTR.

Figure 32:
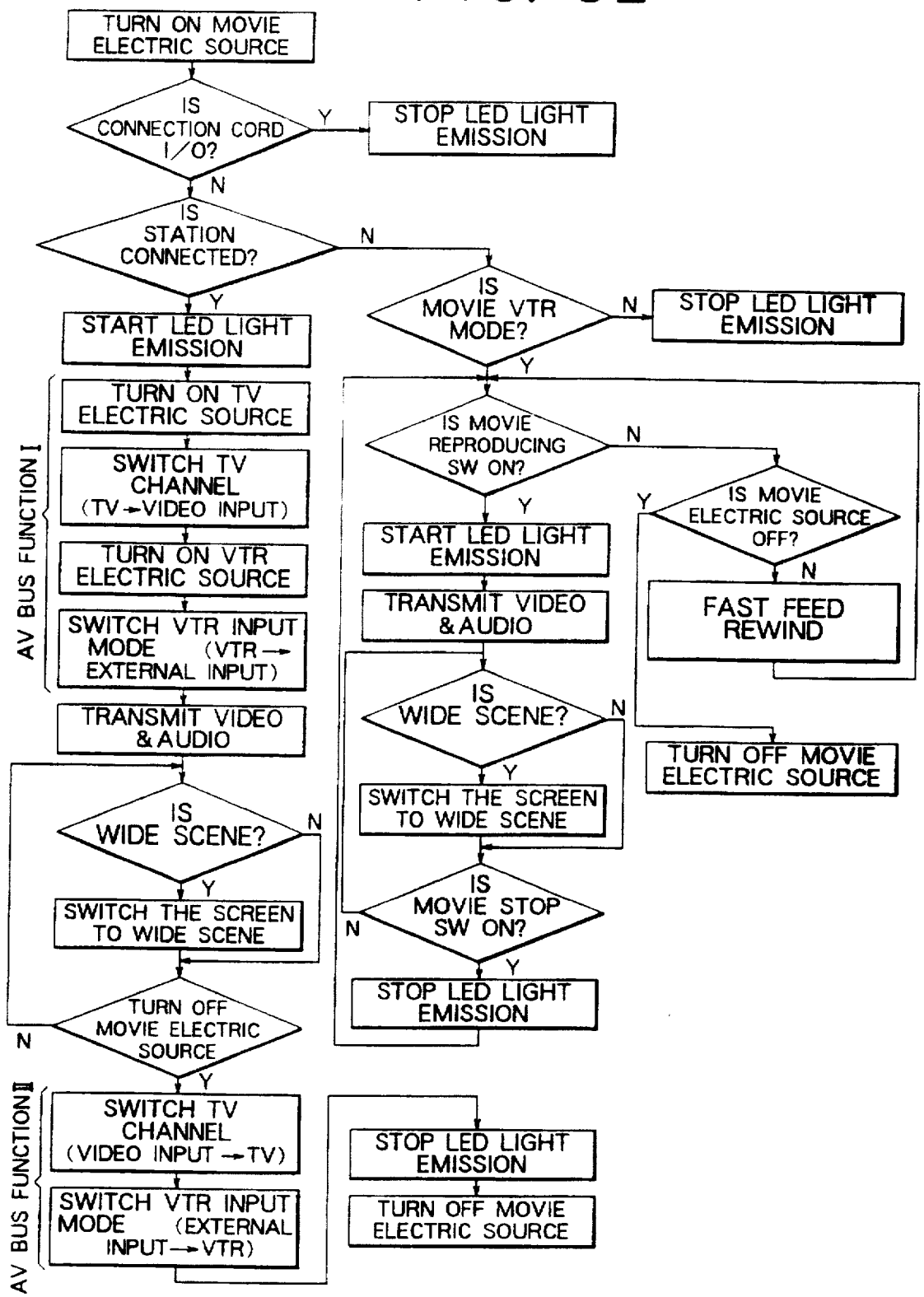

FIG. 32 is a flow chart concerned with ON/OFF of LED light emission in the magnetic recording/reproducing apparatus including the light transmission function depicted in FIG. 28, and the outputting of TV/VTR control signal.

Although this embodiment has shown the case where an AV bus cable function for performing TV/VTR electric source control and input mode switching, as the control signal (CTL), is added to the infrared signal, it may be thought of that a synchronizing editing signal as another signal is added to the infrared signal. When dubbing is carried out by using the synchronizing editing signal in the condition where the compact video camera 456 and a VTR are used as an image reproducing apparatus and an image recording apparatus respectively, temporary stopping of the two apparatuses and canceling of temporary stopping of the two apparatus can be integratedly controlled by the reproducing-side compact video camera 456. As a result, handling performance at the time of video editing can be improved greatly. The synchronizing editing signal may be transmitted as a control signal (CTL) simultaneously with the transmission of video and audio signals.

Although this embodiment has shown the case where maloperation of other apparatuses is suppressed by limiting the addition of the control signal (CTL) to the infrared signal to the short distance transmission in which the compact video camera 456 is used after put on the station 457, the invention can be applied to the case where the addition of the control signal (CTL) to the infrared signal is used in the spatial transmission in which the infrared signal is transmitted in the condition where the compact video camera 456 is placed far from the station 457. In the latter case, in order to suppress maloperation of other apparatuses as extremely as possible, it is preferable that only the AV bus cable function is provided without addition of the synchronizing editing signal. The AV bus cable function may be preferably added to the infrared signal and transmitted at the time of the starting/stopping of light emission of the LED.

Although this embodiment has shown the case where controlling is performed so that a light signal is automatically emitted from the LED only at the time of the reproducing of video and audio signals from the magnetic tape to thereby suppress consumption of the battery as extremely as possible in the spatial transmission in which the light signal is transmitted in the condition where the compact video camera 456 is placed far from the station 457, the invention can be applied to the case where controlling is performed so that the camera/VTR switching signal is always in operation when selected to the VTR mode.

Figure 33:
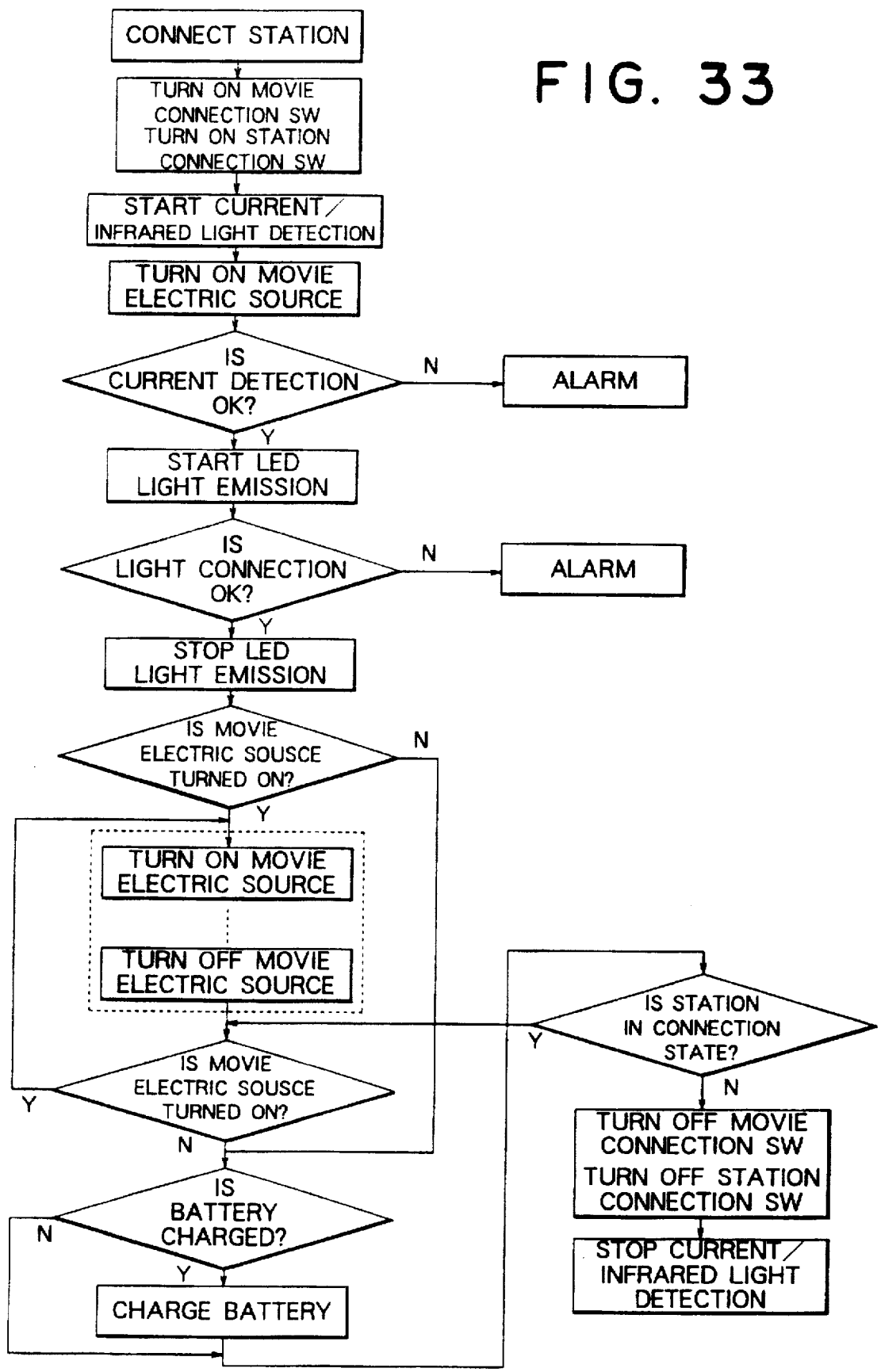
Figure 34:
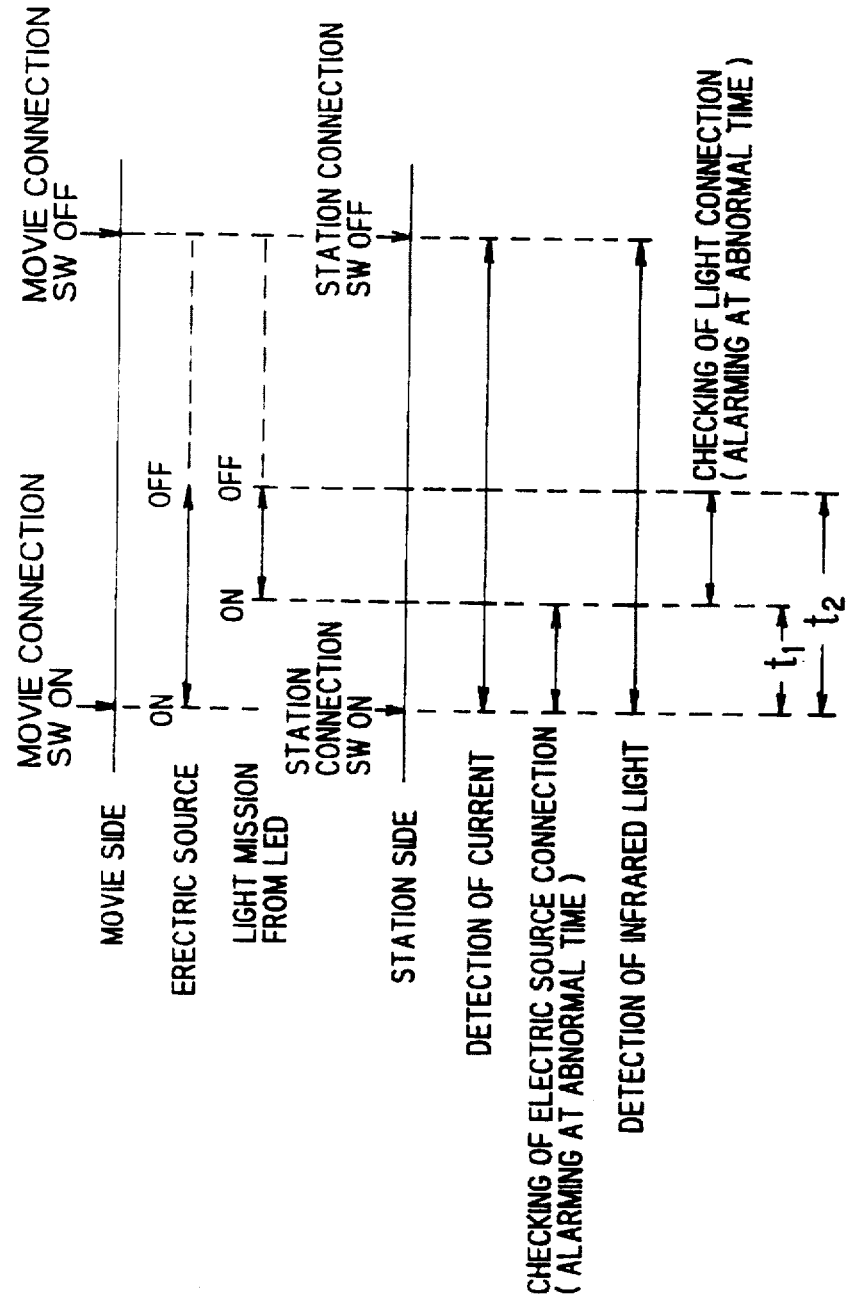
FIG. 34 is a time chart of the operation depicted in the flow chart of FIG. 33.

FIG. 33 is a flow chart of a procedure for checking connection between the compact video camera 456 and the station 457. The timing of checking the connection is shown in FIG. 34.

The system for connecting the video camera and the station to each other as a further embodiment according to the present invention will be described below.

Figure 35:
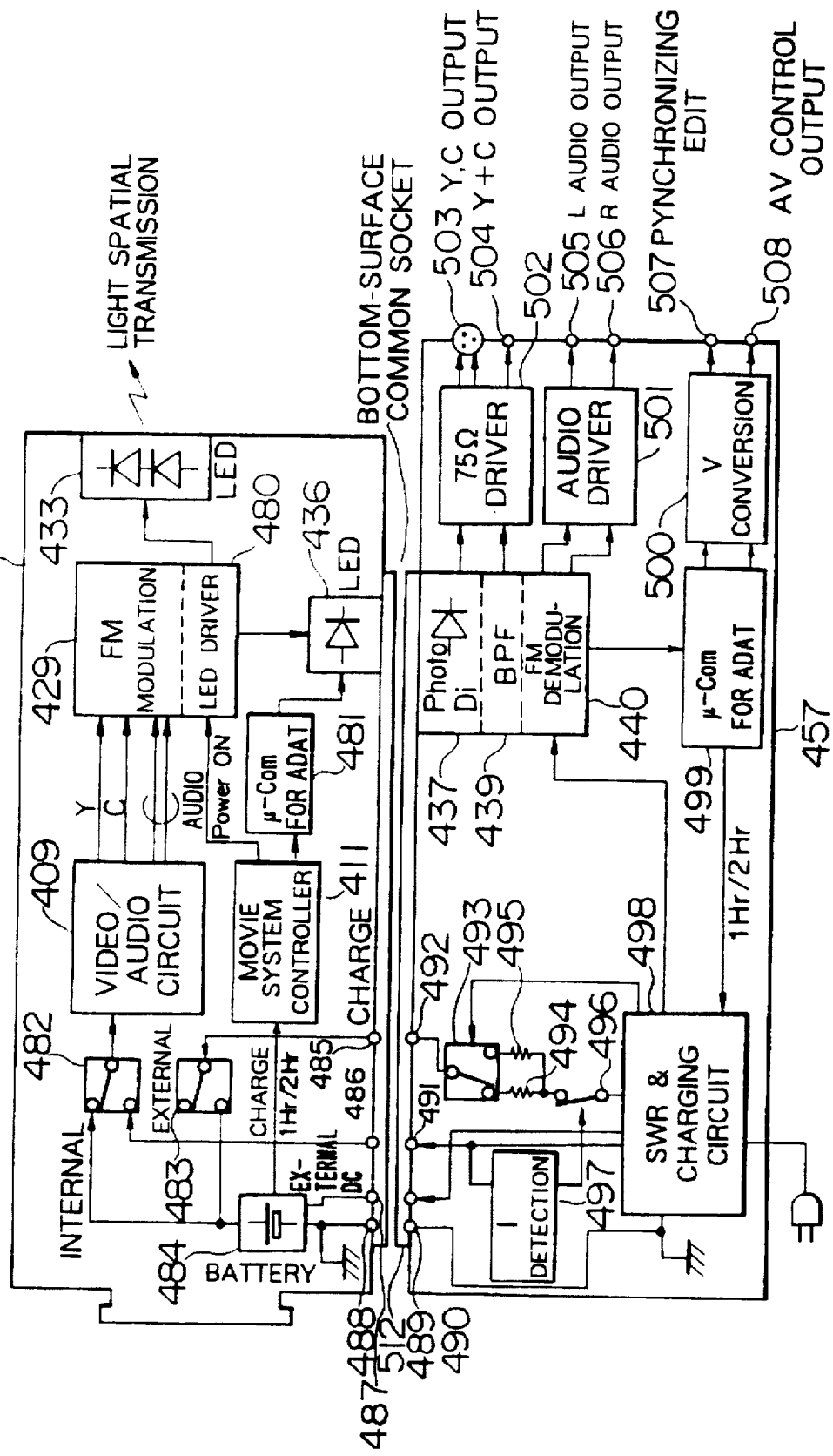
FIGS. 35 to 38 are views showing the respective conditions of connection between the video camera and the station as a further embodiment according to the present invention.
Figure 36:
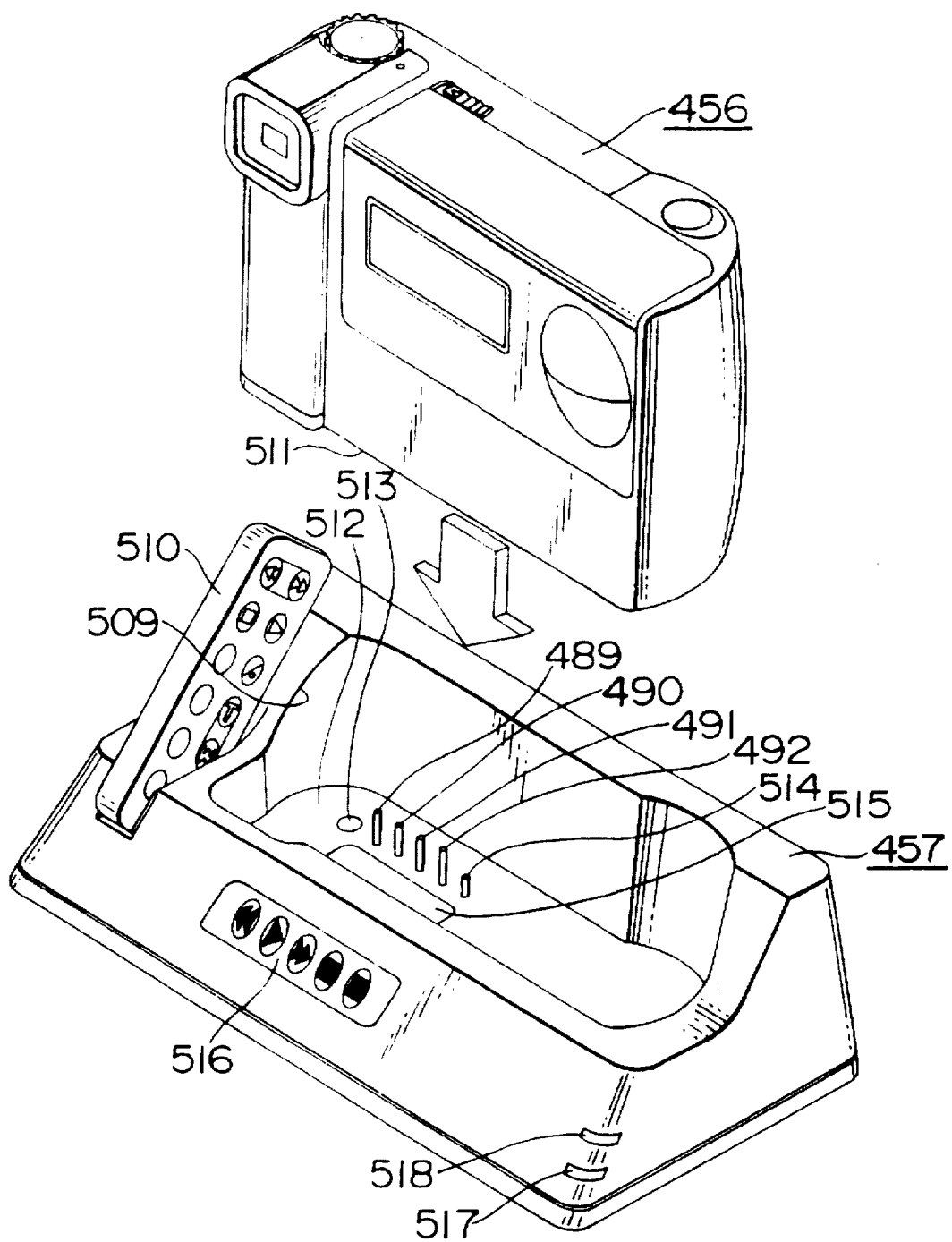
Figure 37:
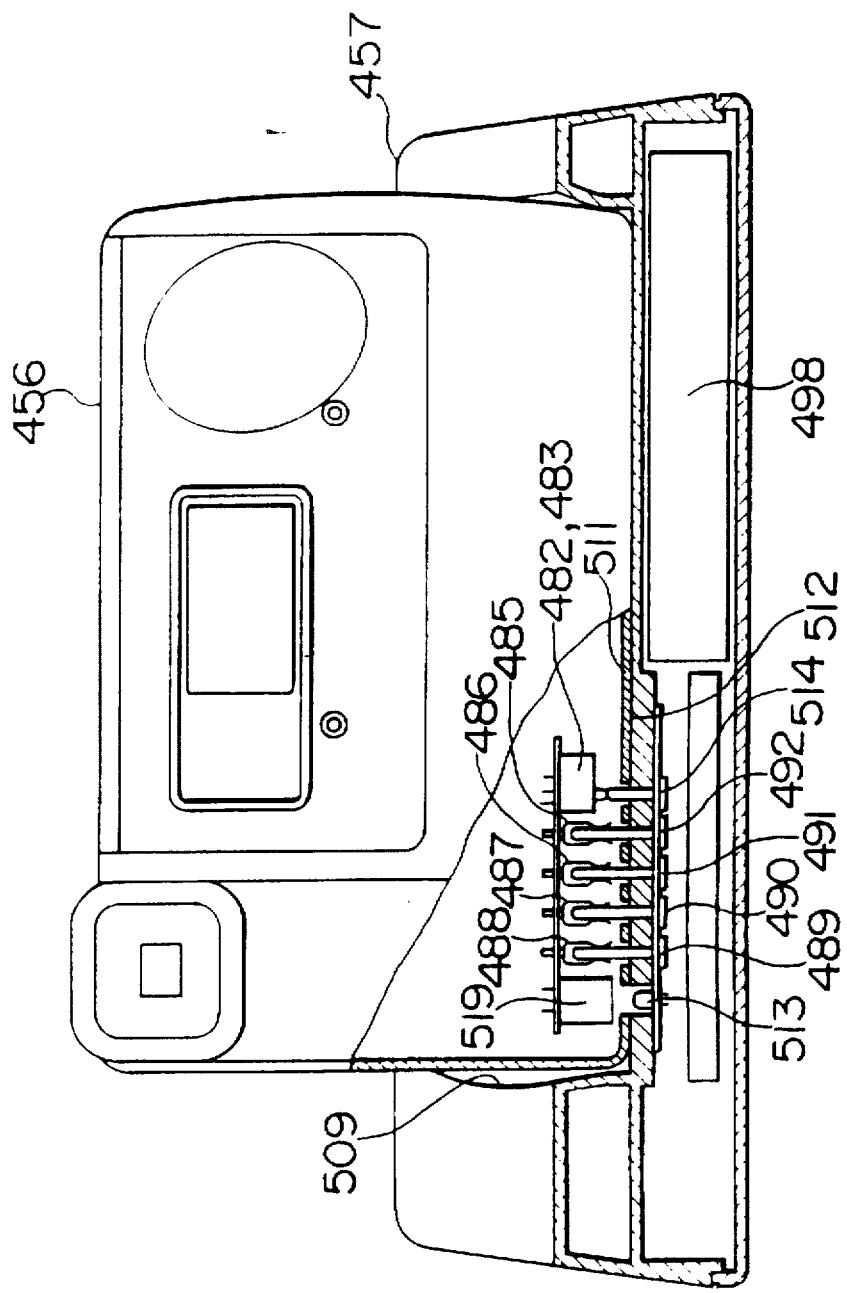
Figure 38:
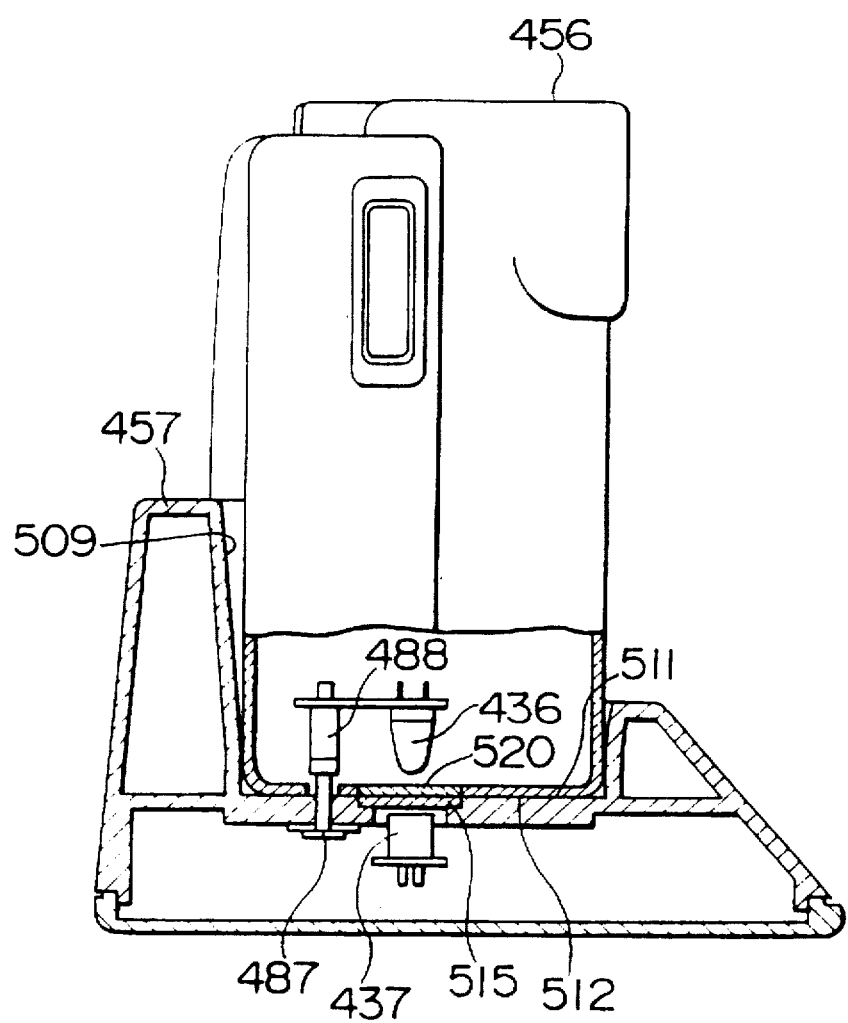

In FIGS. 35 through 38, parts having the same operations as those of parts shown in FIGS. 28, 29 and 30 are identified by the same reference numerals, respectively, and description thereof will be omitted. FIG. 35 is a block diagram of this embodiment. FIG. 36 is an external appearance view for explaining the usage of the compact video camera 456 and the station 457, FIG. 37 is a partly sectional view of important part of a system formed by combining the compact video camera 456 with the station 457, and FIG. 38 is a partly sectional view of the left side of FIG. 37.

In FIG. 35, the reference numeral 480 designates an LED driver for driving an infrared LED, 481 a data conversion micro-computer for transmitting other control data than video, audio, etc., as an infrared light signal in the form of a remote control signal, 482 a switch for changing over between a battery and an external DC electric source, 483 a changeover switch for battery charging, 484 a battery, 485 an electric source input terminal for battery charging, 486 an external DC electric source input terminal, 487 a terminal for outputting temperature data at the time of battery charging, 488 a ground terminal, 489 a camera port side ground terminal, 490 a camera port side battery temperature data input terminal, 491 an external DC electric source output terminal, 492 a battery charging electric source output terminal, 493 a battery charging electric source changeover switch, 494 and 495 respectively resistors for changing over battery charging current, 496 a battery charging start switch, 497 a current detection circuit, 498 a switching regulator for the external DC electric source and the battery charging electric source, 499 a micro-computer for analyzing the control data transmitted as a light signal, 500 an output logic level conversion circuit, 501 an audio signal output driver, 502 a video signal output driver, 503 an S output terminal, 504 a composite signal output terminal, 505 and 506 audio output terminals respectively, 507 a synchronizing editing output terminal, 508 an AV apparatus control signal output terminal, and 511 and 512 respectively connector surfaces for connecting the compact video camera 456 and the station 457. The connector surface 511 is disposed in the lower surface of the compact video camera 456. The connector surface 512 is disposed in the station 457.

First, the supply of electric power from the station 457 to the compact video camera 456 will be described below. When the compact video camera 456 is connected to the station 457 at the connector surface 511, a charging/feeding changeover terminal 514 turns the switches 482 and 483 to an external and charging side so that the external DC electric source is supplied from the terminal 491 to the compact video camera 456 through the terminal 486. At this point of time, the battery charging electric source is controlled through the switch 496 so that it is supplied after the fact that the external DC electric source is not used is detected by the current detection circuit 497, that is, it is supplied only when the external DC electric source is not used. At the time of battery charging, the switch 493 is controlled on the basis of battery terminal voltage and battery temperature to thereby control the charging current.

Having described the method for changing over the switches 482 and 483, various methods such as a method of mechanically detecting the fact that the compact video camera 456 is connected to the station 457 at the connector surfaces 511 and 512, a method of electrically detecting the fact, etc., can be used as other methods. The mechanically detecting method will be described below.

In FIG. 36, a card type remote controller 510 is disposed in the station 457 so that the device 510 can be taken out and put in freely. Further, a function part of the card type remote controller 510 as a camera control panel 516 is embedded in the station 457. Light emitted from a remote-control LED 513 is received by a remote control sensor 519 of the compact video camera 456. Further, an electric source lamp 517 and a charge lamp 518 as indicators are provided in the station 457 and for indicating the current conduction state of the station 457 and the charging state of the battery 484, respectively. A camera engagement portion 509 are planted with pin-shaped terminals 489, 490, 491, 492 and 514 and provided with a light connection light-receiving window 515 and a remote control LED 513.

In FIG. 37, when the compact video camera 456 is set on the camera engagement portion 509 of the station 457, the pin-shaped terminals 489, 490, 491 and 492 are mechanically connected to the respective terminals 488, 487, 486 and 485 in the inside of the compact video camera 456 because the terminals serve as males and females. The terminal 514 abuts on changeover switches 482, 483 and 522 (which will be described later) in the inside of the compact video camera 456 and changes the changeover switches 482, 483 and 522. Infrared light emitted from the remote control LED 513 is received by the remote control sensor 519 in the inside of the compact video camera 456. The switching regulator 498 for the external DC electric source and the battery charging electric source is set in the inside of the station 457.

In FIG. 38, the infrared light-emitting diode (LED) 436 passes through a light connection light-exit window 520 and the station 457 side light connection light-entrance window 515 and enters into the photodiode 437.

The station 457 has the camera engagement portion 509 shaped like a funnel at its upper. The camera engagement portion 509 has the same shape as that of the bottom of the compact video camera 456, so that the compact video camera 456 can be positioned on the station 457. Accordingly, the connector surfaces 511 and 512 are fixed to each other.

Figure 39:
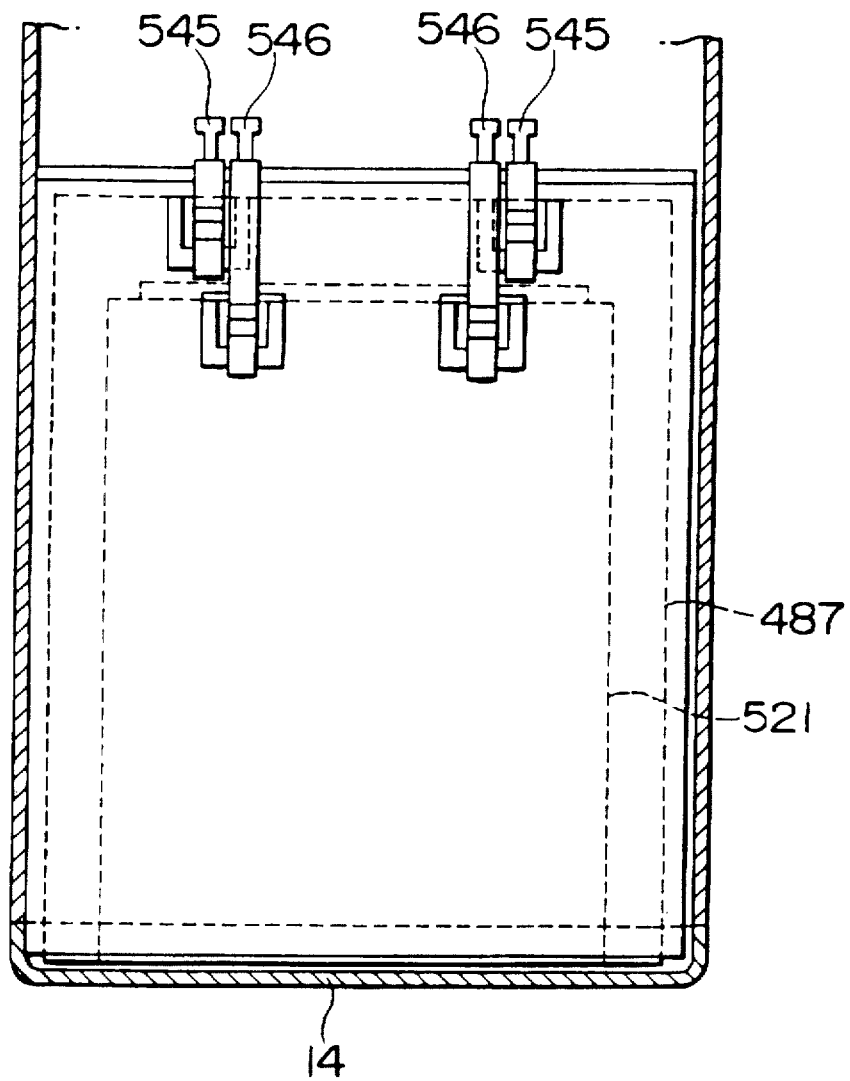
FIG. 39 is a view showing the condition of attachment of primary and secondary batteries.

In the video camera of this embodiment, not only a secondary battery can be used but a primary battery can be used. As shown in FIG. 39, the primary battery 521 and the secondary battery 484 are different in size from each other. Therefore, a first pair of lead terminals 546 for the primary battery 521 and a second pair of lead terminals 545 for the secondary battery 484 are provided in the battery casing 14. The respective pairs of lead terminals 545 and 546 are connected to load, such as a motor, etc., on the video camera through the electric source switch or the like. The second pair of lead terminals 545 are also connected to a feeder of the station through a changeover switch.

Figure 40:
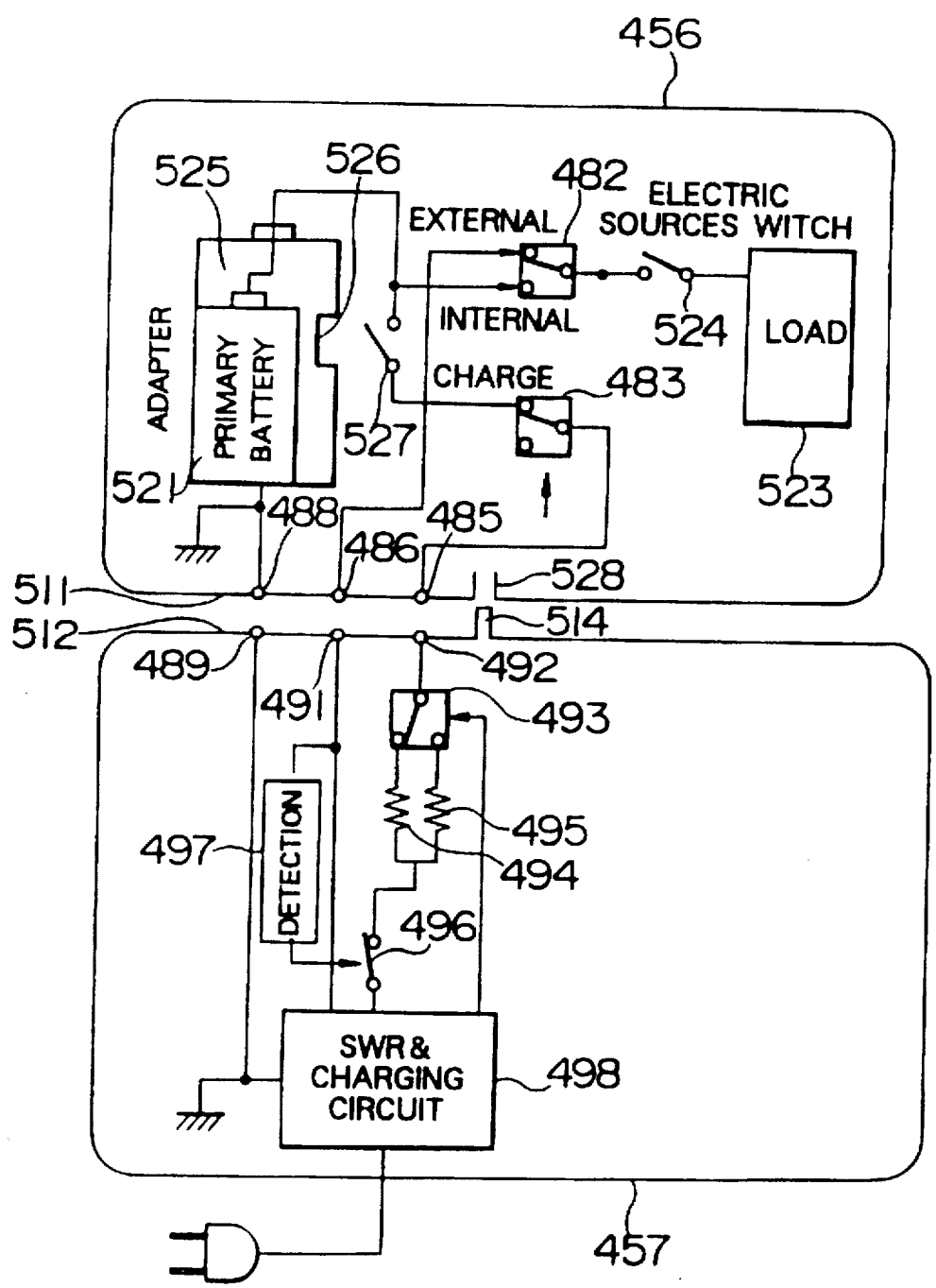
FIG. 40 is a view showing the condition of connection between the video camera and the station as a further embodiment according to the present invention.

FIG. 40 shows another system in which a primary battery and a secondary battery can be used. In FIG. 40, parts having the same operations as those of parts in FIG. 35 are identified by the same reference numerals, respectively. Description of the parts will be omitted partially. FIG. 40 shows the case where the primary battery 521 is used. The primary battery 521 is stored in an adapter 525 having the same shape as that of the secondary battery 484 except a notch portion 526. When the adapter 525 is mounted into the battery casing 14, a movable portion of a switch 527 escapes to the notch portion 526 to thereby disable battery charging from being carried out. When on the contrary, the secondary battery 484 is mounted, the secondary battery 484 per se presses the movable portion of the switch 527 to turn on the switch 527 to thereby enable battery charging to be carried out. When the video camera 456 is set on the station 457, a projecting terminal 514 on the upper surface of the station 457 passes through a receptacle hole 528 in the bottom surface of the camera 456 to thereby press a movable portion of the switch 483 upward to a charging side.

It is preferable that the notch portion 526 is formed in the upper surface of the adapter 525.

Figure 41:
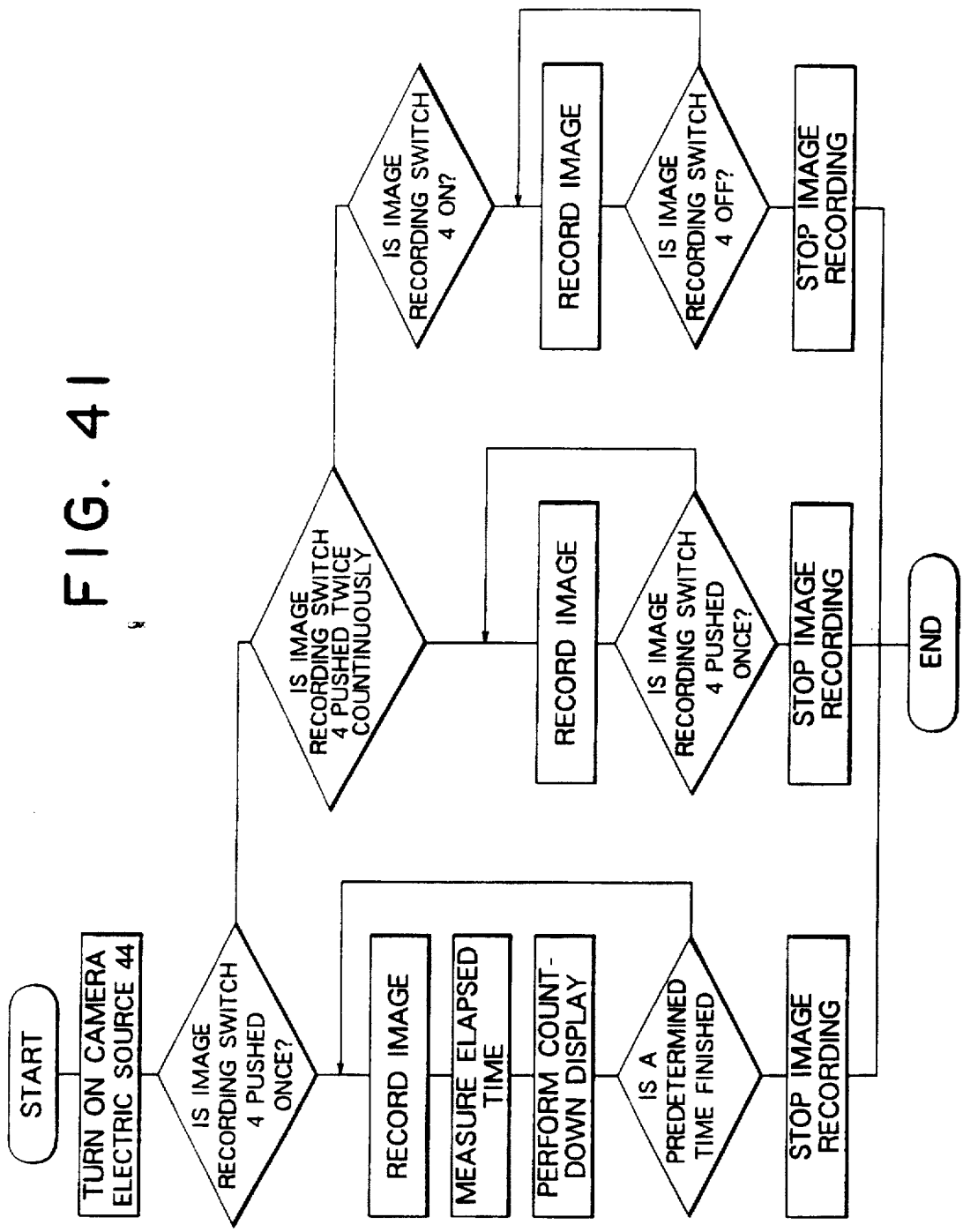
FIG. 41 is a flow chart showing another operation mode in the video camera.
Figure 42:
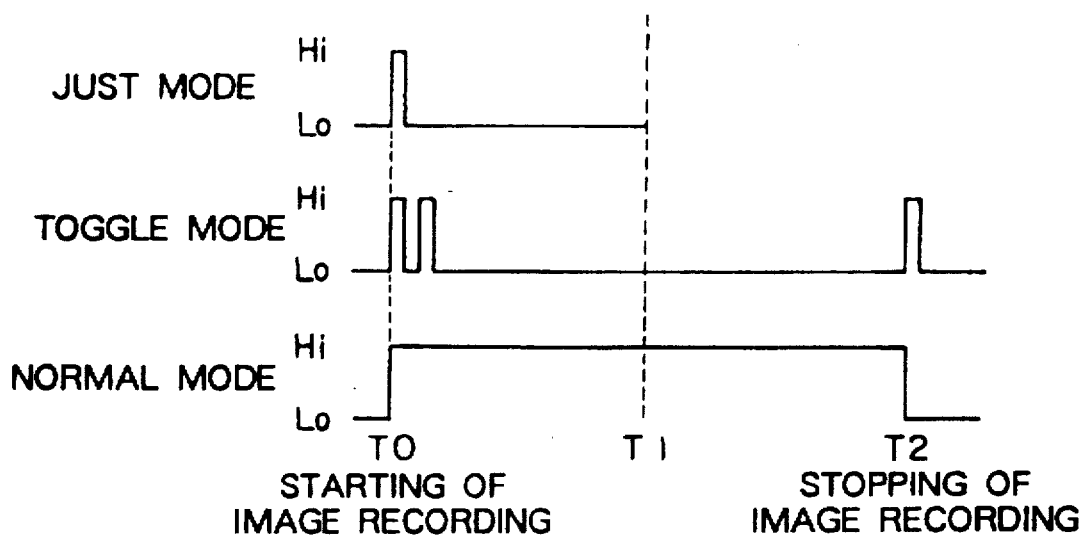
FIG. 42 is a time chart of the same.

FIGS. 41 and 42 show a further embodiment concerned with operation mode switching.

FIG. 41 is a flow chart showing the operation of this embodiment, and FIG. 42 shows the timing of pushing the image recording switch 4. This embodiment does not require the mode changeover switch 6 for changing over the photographing mode as described preliminarily in the embodiment of FIG. 4. That is, a method of changing over the photographing mode in the timing of pushing the image recording switch 4 is as follows. First, in the compact video camera 1 according to the present invention, a just mode (instantaneous photographing mode) is employed as a reference photographing mode. When the image recording switch 4 is pushed once after the camera electric source 44 is turned on, image recording is started. The elapsed time is measured and expressed in count-down display in the viewfinder 12. When a predetermined time (T1) is finished, the image recording is stopped automatically. In order to shift the mode to a toggle mode, the image recording switch 4 is pushed twice in the predetermined time (T1). (Or the image recording switch 4 may be pushed twice continuously at the time of starting of image recording). Upon detection of the fact that the image recording switch 4 is pushed twice in the predetermined time (T1), a system micro-computer (not shown) takes off the limitation of the time T1 so that the image recording is continued till the image recording switch 4 is pushed once more (time T2). In order to shift the mode to a normal mode, the image recording switch 4 is pushed continuously. While the image recording switch 4 is on (Hi) continuously over the time T1, the limitation of the time T1 is taken off so that the image recording is continued. The image recording is terminated when the image recording switch 4 is turned off (Lo). Though not shown, in the case where the image recording switch is pushed once to select the just mode and then elongation of photographing is required suddenly, the image recording switch may be provided so that image recording is continued while the image recording switch is pushed continuously if the image recording switch begins to be pushed in the time T1 so as to be pushed continuously over the point of time T1. That is, if the image recording switch is on (Hi) at the point of time T1, a decision is made that the normal mode is selected. Accordingly, in this embodiment, photographing for a shorter time than the time T1 cannot be performed. In the photographing of the video camera, however, photographing time not shorter than 5 sec is fundamental. Accordingly, it is to be understood that when the time T1 is set to 5 sec, there arises an effect that the resulting photographed image can be prevented from becoming incomprehensible because of shortage of time.

The present invention is not limited to the description of the embodiments.

Japanese Patent Applications Nos. Hei 4-229718 (field Aug. 28, 1992), Hei 4-53800 (field Mar. 12, 1992), Hei 4-92690 (field Apr. 13, 1992), Hei 4-259330 (field Sep. 29, 1992), Hei 4-268419 (field Oct. 7, 1992), Hei 4-274538 (field Oct. 13, 1992), Hei 4-281876 (field Oct. 20, 1992) and Hei 5-16140 (field Feb. 3, 1993) are hereby incorporated herein by reference.

The present invention has been described in detail, it should be understood that various changes, substitutions and alternations can be made hereto without departing from the spirit and scope of the present invention as defined by the appended claims.

What is claimed is:

1. A video camera system comprising:

a video camera including, means for converting a video signal and an audio signal to an electric-video signal and an electric-audio signal, respectively, a VTR for recording/reproducing said electric-video signal and electric-audio signal, means for modulating said electric-video signal and said electric-audio signal opto-converting means for converting the modulated electric-video and electric-audio signals to provide an optical signal, and means for controlling said opto-converting means to be operable when said video camera does not record said electric-video and electric-audio signal from said converting means, a VTR station including, means for receiving said optical signal, converting means for converting said optical signal thus received to an electrical signal and thereafter for demodulating said electrical signal to provide said electric-video signal and said electric-audio signal, and means responsive to said converting means for outputting said electric-video and electric-audio signals.

2. A video camera system comprising:

a video camera including, means for converting a video signal and an audio signal to an electric-video signal and an electric-audio signal, respectively, a VTR for recording/reproducing said electric-video signal and electric-audio signal, means for modulating said electric-video signal and said electric-audio signal, first opto-converting means for converting said modulated electric-video and electric-audio signals to a first optical signal which is emitted from said video camera to a video camera station separated from said video camera, second opto-converting means for converting said modulated electric-video signal, said electric-audio signal and a control signal to a second optical signal which is emitted from said video camera to a video camera station connected to said video camera, and control means for controlling said first opto-converting means to be operable when said video camera is not connected to said video camera station and for controlling said second opto-converting means to be operable when said video camera is connected to said video camera station, a video camera station including, means for receiving said first optical signal and second optical signal, means for converting said first optical signal thus received to a first electrical signal and thereafter for demodulating said first electrical signal to provide said electric-video signal and said electric-audio signal, means for converting said second optical signal to a second electrical signal and thereafter for demodulating said second electrical signal to provide said electric-video signal, said electric-audio signal and said control signal, means for responding to said means for converting said first and second optical signals for outputting said electric-video signal, electric-audio signal and control signal, wherein said control means of said video camera controls said first opto-converting means to be operable when said video camera does not record said electric-video signal and said electric-audio signal converted in said video camera.

3. A video camera system according to claim 2:

wherein said video camera further includes detecting means for detecting whether said video camera is connected to said video camera station;

wherein said video camera station further includes means for connecting said video camera at a proper position to receive said second optical signal; and wherein operation of said first opto-converting means is stopped by said control means when said detecting means detects that said video camera is connected to said video camera station.

4. A video camera system according to claim 2, wherein said video camera station further includes means for connecting said video camera at a proper position to receive said second optical signal and detecting means for detecting whether said video camera is connected to said video camera station, wherein operation of said first opto-converting means is stopped by said control means when said detecting means detects that said video camera is connected to said video camera station.

5. A video camera system comprising:

a video camera including, means for converting a video signal and an audio signal to an electric-video signal and an electric-audio signal, respectively, a VTR for recording/reproducing said electric-video signal and electric-audio signal, means for modulating said electric-video signal and said electric-audio signal opto-converting means for converting the modulated electric-video and electric-audio signals to provide an optical signal, and means for controlling said opto-converting means to be operable when said video camera reproduces said electro-video signal and said electric-audio signal, a VTR station including, means for receiving said optical signal, converting means for converting said optical signal thus received to an electrical signal and thereafter for demodulating said electrical signal to provide said electric-video signal and said electric-audio signal, and means responsive to said converting means for outputting said electric-video and electric-audio signals.

6. A video camera system comprising:

a video camera including, means for converting a video signal and an audio signal to an electric-video signal and an electric-audio signal, respectively, a VTR for recording/reproducing said electric-video signal and electric-audio signal, means for modulating said electric-video signal and said electric-audio signal, first opto-converting means for converting said modulated electric-video and electric-audio signals to a first optical signal which is emitted from said video camera to a video camera station separated from said video camera, second opto-converting means for converting said modulated electric-video signal, said electric-audio signal and a control signal to a second optical signal which is emitted from said video camera to a video camera station connected to said video camera, and control means for controlling said first opto-converting means to be operable when said video camera is not connected to said video camera station and for controlling said second opto-converting means to be operable when said video camera is connected to said video camera station, a video camera station including, means for receiving said first optical signal and second optical signal, means for converting said first optical signal thus received to a first electrical signal and thereafter for demodulating said first electrical signal to provide said electric-video signal and said electric-audio signal, means for converting said second optical signal to a second electrical signal and thereafter for demodulating said second electrical signal to provide said electric-video signal, said electric-audio signal and said control signal, means for responding to said means for converting said first and second optical signals for outputting said electric-video signal, electric-audio signal and control signal, wherein said control means of said video camera controls said first opto-converting means to be operable when said video camera reproduces said electro-video signal and electro-audio signal.

7. A video camera system according to claim 6:

wherein said video camera further includes detecting means for detecting whether said video camera is connected to said video camera station;

wherein said video camera station further includes means for connecting said video camera at a proper position to receive said second optical signal; and wherein operation of said first opto-converting means is stopped by said control means when said detecting means detects that said video camera is connected to said video camera station.

8. A video camera system according to claim 6, wherein said video camera station further includes means for connecting said video camera at a proper position to receive said second optical signal and detecting means for detecting whether said video camera is connected to said video camera station, wherein operation of said first opto-converting means is stopped by said control means when said detecting means detects that said video camera is connected to said video camera station.

* * * * *